(12) United States Patent
Rogers

(10) Patent No.: US 7,274,691 B2
(45) Date of Patent: Sep. 25, 2007

(54) NETWORK SWITCH WITH PACKET SCHEDULING

(75) Inventor: Steven A. Rogers, Alton, NH (US)

(73) Assignee: AVAYA Technology Corp., Basking Ridge, NJ (US)

(*) Notice: Subject to any disclaimer, the term of this patent is extended or adjusted under 35 U.S.C. 154(b) by 727 days.

(21) Appl. No.: 09/746,744

(22) Filed: Dec. 22, 2000

(65) Prior Publication Data
US 2001/0036181 A1 Nov. 1, 2001

Related U.S. Application Data

(60) Provisional application No. 60/171,956, filed on Dec. 23, 1999.

(51) Int. Cl.
H04L 12/28 (2006.01)
H04Q 11/00 (2006.01)

(52) U.S. Cl. .................. 370/389; 370/352; 370/395.2; 370/395.4

(58) Field of Classification Search ................ 370/389, 370/395.2, 395.21, 395.4, 395.42, 395.43, 370/395.52, 352, 356
See application file for complete search history.

(56) References Cited

U.S. PATENT DOCUMENTS

| | | | |
|---|---|---|---|
| 4,491,947 A | 1/1985 | Frank | 370/94 |
| 4,774,707 A | 9/1988 | Raychaudhuri | 370/95 |
| 4,979,165 A | 12/1990 | Dighe et al. | 370/60 |
| 5,042,032 A | 8/1991 | Dighe et al. | 370/94.1 |
| 5,398,236 A | 3/1995 | Hemmady et al. | 370/16 |

(Continued)

FOREIGN PATENT DOCUMENTS

WO   WO 99/65197   12/1999

(Continued)

OTHER PUBLICATIONS

Moore, Sean S. B., and Siller, Jr., Curtis A.; "Packet Sequencing: A Deterministic Protocol for QoS in IP Networks"; Oct. 2003; IEEE Communications Magazine; pp. 98-107.*

(Continued)

*Primary Examiner*—Seema S. Rao
*Assistant Examiner*—Robert C Scheibel
(74) *Attorney, Agent, or Firm*—Chapin IP Law, LLC; David W. Rouille, Esq.; Barry W. Chapin, Esq.

(57) ABSTRACT

An apparatus and method for switching data packet flows by assigning schedules to guaranteed delay and bandwidth traffic. Scheduled bandwidth is subtracted from the available bandwidth, and the remaining unscheduled bandwidth is available for standard "best-efforts" packet transmissions, or other guaranteed packet flows. Guaranteed bandwidth is assigned on a schedule basis, and packet flows are assigned schedules which are mutually acceptable to both transmitters and receivers. Flows transmit and expect to receive packets in accordance with their assigned schedules. Schedules are negotiated between packet transmitter applications and packet receiver applications. During scheduled periods, packets sent by the packet transmitter are directly and immediately forwarded to the assigned packet receiver. Other traffic destined for the receiver is placed in a delay queue, and other packets are not transmitted to the packet receiver during the assigned schedule, as long as the transmitter is still sending guaranteed packets.

39 Claims, 11 Drawing Sheets

U.S. PATENT DOCUMENTS

| | | | |
|---|---|---|---|
| 5,485,147 A | 1/1996 | Jaffe et al. | 340/825.5 |
| 5,557,608 A * | 9/1996 | Calvignac et al. | 370/389 |
| 5,600,641 A | 2/1997 | Duault et al. | 370/400 |
| 5,613,069 A | 3/1997 | Walker | 395/200.15 |
| 5,638,371 A | 6/1997 | Raychaudhuri et al. | 370/347 |
| 5,682,384 A | 10/1997 | Zarros | 370/394 |
| 5,726,984 A | 3/1998 | Kubler et al. | 370/349 |
| 5,761,430 A | 6/1998 | Gross et al. | 395/200.55 |
| 5,793,747 A | 8/1998 | Kline | 370/230 |
| 5,805,589 A | 9/1998 | Hochschild et al. | 370/389 |
| 5,864,542 A | 1/1999 | Gupta et al. | 370/257 |
| 5,946,297 A | 8/1999 | Calvignac et al. | 370/230 |
| 6,038,230 A | 3/2000 | Ofek | 370/389 |
| 6,058,114 A | 5/2000 | Sethuram et al. | 370/397 |
| 6,104,729 A | 8/2000 | Hellum et al. | 370/503 |
| 6,141,355 A | 10/2000 | Palmer et al. | 370/465 |
| 6,157,614 A | 12/2000 | Pasternak et al. | 370/236 |
| 6,215,797 B1 | 4/2001 | Fellman et al. | 370/503 |
| 6,246,702 B1 | 6/2001 | Fellman et al. | 370/503 |
| 6,259,695 B1 | 7/2001 | Ofek | 370/389 |
| 6,272,131 B1 | 8/2001 | Ofek | 370/389 |
| 6,272,132 B1 | 8/2001 | Ofek et al. | 370/389 |
| 6,330,236 B1 | 12/2001 | Ofek et al. | 370/369 |
| 6,570,873 B1 * | 5/2003 | Isoyama et al. | 370/375 |
| 6,611,519 B1 * | 8/2003 | Howe | 370/386 |
| 6,614,797 B1 * | 9/2003 | Hippelainen | 370/410 |

FOREIGN PATENT DOCUMENTS

WO     WO 99/65198     12/1999

OTHER PUBLICATIONS

Chung-Sheng Li et al., *"Time-Driven Priority" Flow Control for Real-Time Heterogeneous Internetworking*, Proceedings of Infocom 1996, vol. 2, Conf. 15, pp. 189-197.

* cited by examiner

STANDARD

PRIORITY-BASED

SCHEDULE_BASED

Network of Scheduled Switches with Signalling Softswitch

Protocol Messages for a
Bi-directional Real-time Session
Establishment and Termination

RECEIVE SIDE PROCESSING

TRANSMIT SIDE PROCESSING

NETWORK SWITCH WITH PACKET SCHEDULING

CROSS REFERENCE TO RELATED APPLICATIONS

This application claims priority under 35 USC §119(e) to provisional application Ser. No. 60/171,956, entitled "NETWORK SWITCH WITH PACKET SCHEDULING", and filed Dec. 23, 1999.

STATEMENT REGARDING FEDERALLY SPONSORED RESEARCH OR DEVELOPMENT

N/A

BACKGROUND OF THE INVENTION

The present invention relates generally to the transmission and switching of data packets through computer networks in a manner which guarantees their delivery within bandwidth and delay limits, as is required for most real-time applications, such as voice telephony. Voice communications are one example of real time communication applications that are sensitive to data delay and to missing data, and to which the present invention may advantageously be applied. Existing Internet packet switches typically cannot guarantee delivery of data within limits needed for high-quality voice communications. To address this problem, the present invention provides a switching technique that allows data packets to be reliably delivered within bandwidth and delay limits.

As it is generally known, packet switches are used to transport Ethernet and Internet Protocol (IP) data packets based on embedded packet addresses. The term "embedded packet address" as used herein, refers to a packet address that is a part of the format of the packet itself. A packet switch is a multi-port device which forwards inbound packets to a particular port only if that port is connected to the next destination of the packet. Packet switching relieves a port or segment of the network from receiving packets which are not addressed to any host or terminal connected to that particular port, as may occur, for example, when network bridges are employed. In packet switching, packets are generally not transmitted to all ports of the switch, but only to those which lead to hosts involved in the relevant communications session. Generally speaking, packet switching has the benefit of increasing the over-all throughput of a packet network, since each segment's available bandwidth is not decreased by another segment's packet traffic. Accordingly, packet switching reduces packet congestion and increases performance.

However, packet switching does not eliminate the problems of packet collisions and variable packet delays. Such problems may occur even when a port is not fully utilized. For example, problems may arise when multiple applications compete for a single port's resources on an instantaneous basis. In particular, the competing applications will interfere with each other, causing variable delays to occur in the transmission or reception of one or more packets.

In existing systems, attempts have been made to address these problems by assigning priorities to packets of different types. In such existing techniques, packets with real-time needs may be assigned a relatively higher priority, so that they are processed before lower priority packets which do not need real-time delivery. Unfortunately, prioritized packet processing does not improve performance in the case where all packets have equivalent priorities. An example of an application in which this scenario arises is voice telephony. In general, many simultaneous telephone calls may be transported on a single port connection. It is not typically known which, if any, of the packets carrying data for such telephone calls should be given higher priority. When multiple priority voice packets are mixed in a single channel, non-deterministic packet congestion and delay may result that is disruptive to a telephone call.

For example, a data channel used exclusively for transporting real-time data via packets may be connected to a packet switch having multiple applications on multiple ports. The real-time data channel may be shared by all such applications using the switch. The real-time data channel may, for example, be used to connect the switch to another switch in another location or to the telephone service company. The channel in question may be considered to have a raw data capacity of $B_r$, given in Bits per Second. Each real-time application requires a bandwidth of $B_a$, where $B_a$ is equal to the application's continuous bandwidth in Bits per Second. Accordingly, the maximum number of real-time applications, N, which can theoretically be transmitted via the channel is:

$$N = Int[B_r/B_a]$$

All applications in a fully utilized channel will have an equal opportunity to transmit a given packet of data. In this example, it is assumed that the applications are the same and transmit packets of the same size, at the same rate. Moreover, all the applications in the example are assumed to transmit independently of one another and not to coordinate their transmissions. All applications are also assumed to transmit packets at fixed intervals, in accordance with their application needs. Finally, all packets have the same importance to their senders, and therefore have the same priority. At any given moment, as a given application sends a packet to the shared channel, the packet has a probability $P_d$ of entering the channel without any delay, which may be expressed as:

$$P_{(d=0)} = 1/N$$

The above probability holds because a fully loaded channel only has one chance in N of having an available window in the outbound packet stream, for any given application, at any given instant. As a packet is sent to the channel it must compete with other packets of other applications for the channel resource. In particular, other packets may have arrived earlier, and already be waiting in a queue for their transmission opportunity. Competition for positions in the outbound data stream will result in delays, as the packets are put in queue and sent, one by one. The maximum expected delay should equal the transit time of N packets, which would occur in the case where a new packet is received just after packets were received from all other applications. The actual delay will vary unpredictably between the minimum and maximum possible delays.

To estimate the delay experienced by a packet it is also necessary to consider the "transit time" occurring while the packet is in transit. For these purposes, "transit time" shall be used to refer to time required to transmit a given packet to the channel. Accordingly, transit time (T) is equal to the packet length in bits (L) divided by the data rate in Bits per Second (R), as follows:

$$T = L/R$$

The maximum delay ($D_{max}$) is then:

$$D_{max} = NT$$

and the average delay ($D_{avg}$) would be:

$$D_{avg} = NT/2$$

For a real-time application, this variable delay introduced by conventional packet switching systems must be accounted for in the system design. That is, the actual packet delay encountered can vary from zero to $D_{max}$, with an average delay of $D_{avg}$. The variation in the delay is known as "jitter", and also must be accounted for in system design. Jitter compensation is accomplished with buffering. Accordingly, an application must be able to buffer the received data packets, with the ability to handle a packet-to-packet jitter of up to $D_{max}$ in order to prevent packet loss due to jitter. The receive jitter buffer then can deliver packets to the application at regular intervals. If the application does not buffer incoming data, then an overrun or underrun condition may result. In the case of an underrun the momentary delay in a packet's arrival may cause the packet to be too late to be processed and played by the receiving application. That is, the receiving application may not have data available to process when the next sample must be output. In a voice communication application, which terminates in a telephone, the speech signal must be continuously fed to the user's ear piece. If data is not received because of packet delay, then the speech being output will be interrupted. For this reason, telephone based voice communication applications should provide a jitter buffer. These receive jitter buffers increase the overall system delay because packets spend time stored within the jitter buffer. If each packet is important, then the jitter buffer should be sized to compensate for the maximum possible jitter. Thus the time delay introduced by the jitter buffer can be equal to or greater than the maximum packet-to-packet jitter for the system.

Packet jitter accumulates as a packet traverses a typical communications network. When the packet makes multiple switch and channel transitions before reaching its destination, as is normally the case, then the total delay will increase. Delays at a given switch and communications channel are not normally correlated to delays experienced at subsequent switches. In fact, the average and maximum delays increase with the number of switches along a route. Accordingly, for M switch "hops", the delay characteristics of a route will be:

$$D_{max(M)} = \sum_{i=1}^{M} D_{max}(i)$$

Where $D_{max}(i)$ is the maximum delay in each switch along the path to the destination. The minimum switching delay is still zero as there is a finite probability that the packet will encounter no switching delays in route. Thus the maximum delay is equivalent to the maximum delay $D_{max}(M)$.

Existing packet switching networks also introduce fixed delays as well as the packet insertion delays. Such fixed delays result from a variety of causes. First, packets experience propagation delays which depend on the physical distance over which they are transmitted. The speed of light in free space is another fundamental limitation underlying such delays. Light propagates much more slowly through a physical communication media, such as an optical fiber, than it does in free space. The resulting delay can become significant for long distance, real-time communications, especially when a packet takes a circuitous route to its destination.

Insertion delays related to the length of the packet and the time it takes to transmit the packet on a given channel are also introduced in existing communication networks. For example, a principle difficulty in real-time packet communications over modems is that the insertion delay onto the relatively narrow bandwidth communications channel can be significantly high. Delays caused by distance and by modem insertion together can be enough to make high-quality voice communications over a network infeasible, without even considering switching delays.

In addition to the delays discussed above, existing packet switching devices have their own delays. Most switches and routers place received packets into an input queue. Such devices then determine each received packet's next destination, and place each received packet into the output queue of the appropriate port. The packet is then transmitted when it reaches the top of the queue. Even in the case where the packet is high priority, and there are no queuing delays resulting from other high priority packets, the steps performed by the switch in moving the packet from queue to queue within the switch may add significant delay to the packet.

Other network packet traffic can also add delays, even if the traffic is lower in priority. In many existing networks, many types of packet traffic are inter-mixed. As a result, a variety of packet applications compete for the available bandwidth through the network. Prioritization of the packet traffic does not guarantee that high priority packets will be sent with no delay. In fact, the opposite may occur. For example, consider the case where a lower priority packet is received and forwarded just before receipt of a higher priority packet, such that the lower priority packet has begun transmission just before the higher priority packet is received. The lower priority packet will then be transmitted first, and the higher priority packet must wait until it can be sent afterwards. There is generally no way to interrupt the lower priority packet in the middle of its transmission in order to preemptively send the higher priority packet. Accordingly, the higher priority packet can potentially be delayed at each hop, by the time required to transmit a maximum length low priority packet. As a further complication, for reasons of efficiency, lower priority traffic is often aggregated into maximum length packets, thus increasing the potential delay. On the other hand, higher priority packets are often very short, in order to lessen the insertion delay characteristics across the network. As a case in point, in the Ethernet communication protocol, the ratio between the maximum size and minimum size packet may be greater than 20:1. This means that even in priority ordered switches, the packet delay experienced by a higher priority packet at each hop resulting from transmission of lower priority packets can potentially be equivalent to the time needed to transmit more than 20 of the smaller, higher priority packets. Some networks are now transmitting "Jumbo" packets, which make the delay even longer.

In real-time applications, packets may vary in size, depending on the tolerable delay characteristics. Accordingly, more small packets, or fewer large packets, may be used in order to transfer information at a given rate. When fewer large packets are employed, less burden is placed on switching resources and on the transmitting and receiving systems. This is because switching resources have limited performance in terms of the rate at which packets can be processed. Also, transmitting and receiving hosts must be "software interrupted" to process each packet, so they too have performance limits in terms of numbers of packets processed per second. On the other hand, using fewer, larger packets to transfer the same amount of data means that more data must be aggregated into each packet. Accordingly, the delays introduced may be even longer due to the increased length of the packet transit time represented by N in the above equation.

Consider the case where a high priority voice packet containing 100 bytes is delayed by a "Jumbo" packet. Some Jumbo packets are six times larger than the current maximum length Internet Protocol packet. Many users strongly support the use of Jumbo packets because shorter packets put an undue stress on network servers with very high-speed network connections. However, Jumbo packets may wreak havoc with real-time applications, using current switch technology. Jumbo packets can potentially delay a single high priority voice packet, containing 100 bytes, to the same extent as 90 other voice packets.

Low priority packet queuing delay also accumulates over multiple switch traversals. It is common to traverse 30 or more switches when crossing a network from a transmitter to a receiver. Thus, even in a perfectly operating, priority-based network with only one call active, a low priority packet queuing delay equivalent to 2,700 other high-priority voice packets may occur.

Delay and delay variation are not the only problems encountered in connection with prior art packet switches. Real-time applications are often provided with bandwidth guarantees. If the network channel is not sufficient to simultaneously support the total amount of bandwidth guarantees for all possible sessions, then the network is "over-subscribed". In existing systems, it is completely possible for the network bandwidth, on any given channel leg or switch, to be over-subscribed. Such over-subscription may occur whether the packet traffic is prioritized or not. In the case of where priority schemes are used, then the higher priority traffic (presumably voice traffic) may pass through the channel unobstructed, so long as the higher priority traffic itself does not over-subscribe the channel. In this case the higher priority traffic may have adverse performance effects on the lower priority traffic. In existing systems, there is generally no reliable means for allocating bandwidth in such a situation. Accordingly, over-subscription can result in complete disruption of lower priority traffic, and in some cases, higher-priority traffic as well.

Levels of packet congestion can change dramatically on a moment-by-moment basis, during the course of a single real-time session. For instance, a telephone call may be set up, over a packet network, when network traffic conditions are relatively good. Unfortunately, during the call, it is completely possible for the level of congestion to grow rapidly to a point where the call is degraded or even disrupted. Such a situation is generally intolerable for most mission critical real-time applications and particularly for voice telephony. In this case it is not sufficient for the average traffic to be equal to or less than the bandwidth available. To avoid contention, normally packets will be lost if the congestion exceeds, even momentarily, the capacity of the common channel. For this reason, the total system bandwidth must be equal to or greater than the maximum bandwidth required by all applications, at any given instant.

As described above, packet networks suffer from delay and delay variations even in an idealized case where all traffic is characterized, there is no over-subscription, and priority schemes are used. Moreover, existing packet switches can easily encounter over-subscription, even where priority schemes are used. For these reasons, in order to effectively support real-time applications on packet networks, a packet switch is needed that controls and minimizes delay. It would further be advantageous to have a system that also guarantees the use of bandwidth for the duration of a real-time session, and then releases that bandwidth, to another application, when the session is complete. In the case of real-time applications such as voice telephony via packets, the system should provide callers with a total voice delay performance approximating that obtained from the existing circuit-switched telephone network. Finally, callers should know, when they begin a call, that the call will have a guaranteed performance, until the call is terminated.

BRIEF SUMMARY OF THE INVENTION

In accordance with principles of the invention, a packet switch is disclosed herein that is capable of allocating bandwidth to each one of multiple real-time applications such that packet delay is controlled and guaranteed packet delivery is provided. The disclosed switch provides dynamic bandwidth allocation which alleviates transmission problems caused by bandwidth contention. The disclosed system allocates bandwidth for use during respective real-time communication sessions. Operation of the disclosed dynamic bandwidth allocation system does not degrade the packet switching performance of other packet traffic except to the extent that available bandwidth on the affected ports is decreased.

The present disclosure includes a scheduling system which may be added to a conventional packet switch architecture. The disclosed scheduling system is applied separately to the transmit and receive functions within each port of a switch. Through the disclosed scheduling system, a switch is able to operate in accordance with the needs of particular applications in terms of guaranteed bandwidth and controlled delay. For the purposes herein, the term "packet flow" is used to refer to those packets associated with a specific application. A packet flow is further considered herein to refer to a unidirectional flow of packets between a transmitting host and a receiving host that is associated with an application.

Within each switch, the disclosed scheduling system is based on the occurrence of schedules. Schedules are expected time periods during which packet transmissions and/or receptions for one or more packet flows. Schedules occur independently at each switch within the network. A given schedule may apply to the transmit and receive functions of all ports within a switch, or to a subset of the transmit and/or receive functions of one or more ports within a switch. Accordingly, a given switch may operate based on a single schedule, or on multiple schedules. Schedules may be repeated continuously. Alternatively, each schedule may be triggered explicitly in response to a trigger event, as further described below.

Within a schedule interval, packet flow offsets define the beginnings of packets or packet groups associated with packet flows. In the case where a packet flow offset is associated with the transmit function of a switch port, that packet flow offset defines a time within a schedule interval at which transmission of one or more packets for the associated packet flow may be initiated. In the case where a packet flow offset is associated with a receive function of a switch port, that packet flow offset defines a point in time within a schedule interval at which reception of one or more packets for the associated packet flow may be expected.

For a given packet flow, different packet flow offsets are established for each switch along the path between a host transmitter and a host receiver. The set of offset values associated with a packet flow for all switches along such a path defines the schedule for that packet flow (also referred to as a "packet flow schedule"). A packet flow schedule may also include a schedule interval duration and packet length. A time period within the schedule interval associated with a given packet flow schedule is referred to as the packet flow schedule period.

Individual packet flow schedules are determined based on the needs of the application associated with the packet flow, and a computed best transit path through the network. Packet flow schedules can be granted to any application, up to the bandwidth limitations of the relevant communications channel. A packet flow schedule associated with an application guarantees that application time during which it can place one or more packets into a transmission path. Packet flow schedules can be allocated to any application in any order or sequence, until all of the transmission time for the channel is allocated. Any unallocated transmission opportunities may be used to transport conventional packet traffic, which may be switched and forwarded as in existing systems.

When a packet flow is established, an associated packet flow schedule is coordinated between the switches along the path between the transmitting host and the receiving host for that packet flow. Based on this packet flow schedule, a given switch may transmit a guaranteed bandwidth packet for the packet flow based on the packet flow schedule to the next switch along the path to the receiving host. Also based on this packet flow schedule, the next switch will expect the arrival of the guaranteed bandwidth packet at a time indicated by the packet flow schedule. In this way, based on the formation of the packet flow schedule across the switches within the path, dedicated bandwidth is provided between any given transmitter and receivers). Accordingly, when a host transmitter transmits a packet, based on the packet flow schedule, the packet is automatically transmitted, without delay, to the host receiver. For any given switch, any given packet flow schedule is active for its link through the switch, in one direction. Each switch port may have its own dedicated schedule intervals, one for the transmit function and one for the receive function. For the real-time session to be established, the packet flow offsets associated with transmitting packets and the packet flow offsets associated with receiving packets will coincide, through each switch along the path. The set of packet flow offsets associated with a given packet flow, across the set of switches along the path for that packet flow is also sometimes referred to herein as the "packet trajectory" for that packet flow. Guaranteed bandwidth packets transmitted using the disclosed scheduling system are referred to as "scheduled" packets. Included in the computation of flow schedules are the delays associated with the transmission path and with the switching systems within the switches themselves.

The disclosed system requires that the host transmitter be able to coordinate its transmissions with all the switches along the path to the host receiver. Each switch carrying a scheduled packet must be schedule coordinated with the next switch along the path to the host receiver for the associated packet flow.

Negotiation or coordination with the last switch in the path is not required of the host receiver. The last switch in the path only sends the host receiver packets according to the packet flow schedule(s) associated with that host receiver. Since the host receiver receives all of its packets from the last switch in the path, that same switch will control the delivery of all packets to that receiver. Thus, the host receiver does not generally need to coordinate schedule information. The host receiver will always receive guaranteed bandwidth packets at the correct time. The receiver may normally derive any application timing information it needs to schedule the playing of the information contained in the real-time packets, from the packets themselves. Guaranteeing packet delivery times greatly reduces the need to maintain large packet jitter buffers, to counter jitter or even packet collision and retransmission problems. Since the receiver always receives the next packet in the sequence, on time, it does not require extensive jitter buffering.

Real time packet flows between switches are accomplished by coordinating schedules between switches. This inter-switch coordination is accomplished by means of a special application which computes and delivers schedules between switches. This application must have knowledge of schedule flows, the delays in switches and in the links between switches, the link speeds, and the network topology. When the schedule application receives a request it can thus compute the fastest schedule through the network of switches for the packet flow.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

The disclosures of provisional application Ser. No. 60/171,956, entitled "NETWORK SWITCH WITH PACKET SCHEDULING", and filed Dec. 23, 1999, to which this application claims priority under 35 USC §119 (e), are hereby incorporated by reference herein.

Figure 1:
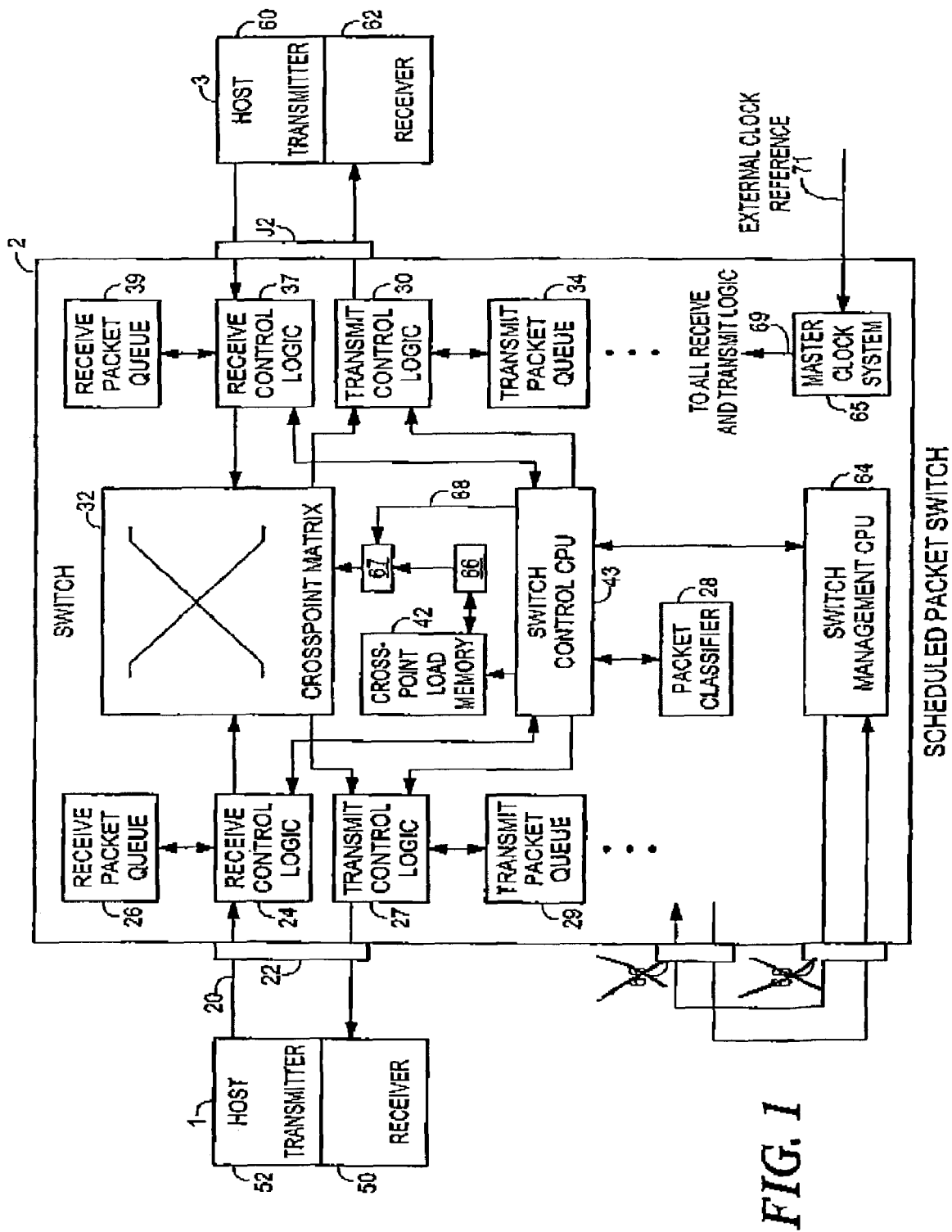
FIG. 1 shows a high level block diagram of an illustrative scheduled packet switch, with two attached receiver/transmitter hosts, as well as key elements of the switch and the principal signal paths.

As illustrated in FIG. 1, and consistent with an illustrative embodiment of the invention, a high level block diagram of the invention shows three components: a switch 2, a first host terminal 1, and a second host terminal 3. Each of the host terminals 1 and 3 are operable to transmit and/or receive packets.

A packet which does not require guarantees in terms of delivery and/or delay is passed through the switch 2 as follows: First, the host terminal 1 transmits the packet over a communication link 20 to the switch. In the case where the host terminal 1 is interconnected to the switch 2 via an Ethernet interface, the communication link 20 may be a four pair cable, made up of UTP (Unshielded Twisted Pair) wire. However, the switch 2 may be embodied using interfaces to a wide variety of communication channels or links, including, but not limited to, 10 megabit/second, 100 megabit/second and gigabit, and 10 gigabit Ethernet networks. The switch 2 may also employ interfaces to what are conventionally referred to as "OC", "DS", "T", "E" and other fiber-based or wireless-based links or channels associated with the SONET (Synchronous Optical NETwork) and SDH (Synchronous Digital Hierarchy) communications standards, and suitable for transmitting Internet or Ethernet packets. Accordingly, the disclosed system does not require interfaces to any particular type of communications link. For purposes illustration, reference is made herein to an embodiment using standard Ethernet interfaces, although a switch made in accordance with the disclosed system may include interfaces of other kinds.

The interface connecting the switch 2 to the communication link between the host terminal 1 and the switch 2 may be embodied using a standard connector 22, such as what is commonly referred to as an "RJ-45" connector, which is conventionally used to connect to an Ethernet network. After reception at the connector 22, the packet is carried into the receive control logic (RCL) 24. RCL 24 operates to extract the packet's destination address and to place the packet's contents into the receive packet queue 26. The RCL 24 concurrently sends a query to the switch control CPU (SCC) 43, which contains the packet address of the destination. The SCC 43 takes the packet address, which consists of both an Ethernet MAC (Media Access Controller) address and an IP (Internet Protocol) address, and uses the packet address to determine a port number indicating which port the packet should be transmitted to. The SCC 43 operates to perform these actions in one of two ways: (1) by checking an internal look-up table, or by sending the packet address to the packet classifier (PC) 28. The packet classifier 28 operates to specifically map an IP or Ethernet MAC address to a port on the switch 2. The packet classifier 28, for example, may employ a Content Addressable Memory (CAM) system to rapidly return a port number, given a packet address.

Once the SCC 43 has identified the correct port number, the SCC 43 checks an internal memory table to determine if the destination port transmit control logic (TCL) on the crosspoint matrix 32, for example transmit control logic (TCL) 30, is not in use for a scheduled transmission. The destination port TCL may be busy receiving a packet from another source. If the destination port TCL is in use, then the SCC 43 stores the request in a queue and waits for the next request. If the destination port TCL on the crosspoint matrix 32 is not in use, then the SCC 43 will command the crosspoint matrix 32 to set up a connection between the crosspoint matrix port connected to an internal switch output of RCL 24, and the crosspoint matrix's connection to the internal switch input to TCL 30. As soon as this connection is complete, the SCC 43 sends a message to the RCL 24. This message instructs RCL 24 to send the packet directly to the crosspoint matrix 32. RCL 24 then transmits the packet to the crosspoint matrix 32. Simultaneously, TCL 30 will receive the packet. If there is no packet currently in transmission from the transmit packet queue (TPQ) 34, then the TCL 30 will immediately begin transmission of the incoming packet to the host terminal 3.

In the embodiment of FIG. 1, the receive control logic 24, receive packet queue 26, transmit control logic 27 and transmit packet queue 29 are considered to be included within first port of the switch 2. Similarly, the transmit control logic 30, transmit packet queue 34, receive control logic 37 and receive packet queue 39 are considered to be included within a second port of the switch 2. Accordingly, in the case where a packet is received at the first port of the switch 2 and forwarded to the second port of switch 2 for transmission, then the first port is referred to as the incoming or source port, and the second port is referred to as the outgoing or destination port. Once the RCL 24 has completed its transmission of the packet to the crosspoint matrix 32, RCL 24 signals the SCC 43 that it is finished. The SCC 43 then sets the appropriate entry in an internal memory table to a "clear" state for the transmit side of the outgoing port, thus indicating that the transmit function of the output port is available to receive a packet from any other port. The SCC 43 can then also break an existing connection between the two ports.

In this process, all packets can enter the switch 2, be identified, and be routed to the correct destination port. Those skilled in the art will recognize that conventional components referred to "switch fabrics" are available which incorporate some or all of the functions performed by the SCC 43, PC 28, crosspoint load memory (CPLM) 42 and crosspoint matrix 32. Such conventional switch fabrics may be used within embodiments of the disclosed scheduling packet switch.

The transmission of packets associated with delivery and delay limit guarantees, referred to as real-time packets, is now described. Such packets may, for example, be associated with real-time applications. The association between a real-time packet and a real-time application may, for example, be through packet flow. A packet flow associated with a real-time application may be identified by some set of packet header field values that are common to all packets within the packet flow. Real-time packets may also be handled by the switch 2. For example, processing of real-time packets sent by the host 1 to the switch 2 requires that the host 1 coordinate its guaranteed transmissions with the switch 2. The host 1 will further send its real-time packets in accordance with a predetermined, allocated schedule. In order to perform such operations, the host 1 must have a common time reference between its packet transmitter and the relevant receiver in the switch 2. Tn the disclosed system, this is enabled through the following process. First, the switch 2 sends an Ethernet packet to the receiver 50 within the host 1. This packet will be identified by the switch 2 as containing reference information. The receiver 50 within the host 1 then uses the reference packet, which is also referred to as a "heartbeat" packet, to determine the start of a schedule interval. The switch 2 operates to send the heartbeat packet with sufficient regularity so that the receiver 50 in the host 1 can adequately determine the beginning of its schedule interval. For example, the receiver 50 may average the timing information gathered from the receipt of multiple heartbeat packets to provide a reference lock. In this way the host transmitter 52 may be effectively phase-locked to a reference source from the switch 2. All ports of the switch 2 which are used to support the disclosed scheduled service are able to emit the heartbeat packets. The heartbeat packets need not need be sent at regular intervals, since each heartbeat packet contains information within its packet data field that may be used to determine its phase relative to the switch's schedule interval. For purposes of illustration, the heartbeat packets will be described as being provided at regular intervals in the present description. As shown in the embodiment of FIG. 1, a master clock system 65, having connections 69 to all receive and transmit control logic within the switch 2, may be used to provide the schedule interval to the receive and transmit control logic within the switch 2. The master clock system 65 is shown responsive to an external clock reference 71, such as the above discussed received heartbeat packets.

The heartbeat packet may also convey other information, of an administrative nature. The heartbeat packet's primary function, however, is to provide a correct timing reference. Any host which receives the packet, will adjust its internal reference to match, using an averaging algorithm. The heartbeat packets allow any host or any network of hosts to derive a timing reference from a common source. In this way, all local hosts or ports, which need to transmit guaranteed data in the form of real-time packets, will have an accurate, local frame of reference. Every potential host-transmitter is thus referenced to the switches' reference. In any collection of switches, referred to herein as a "schedule domain", the heartbeat can originate from a single switch. Each switch in the network can then be configured to receive the heartbeat from at least one port and to send heartbeats out of a number of "downstream" ports, such that the heartbeat packets are distributed through the network of switches in a tree configuration, with the heartbeat source being the root of the tree.

Figure 2A:
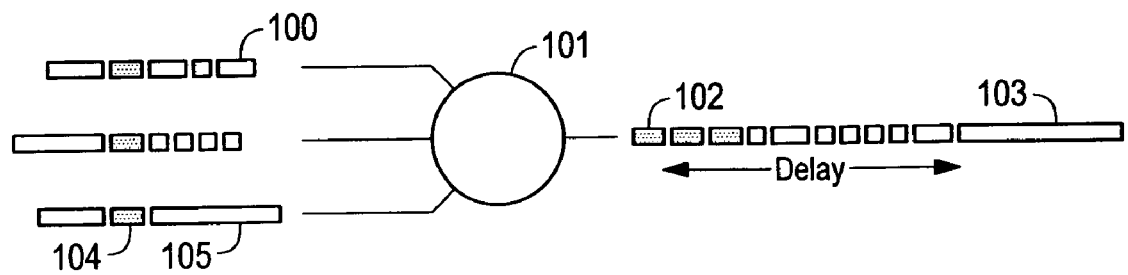
FIGS. 2(*a*), 2(*b*) and 2(*c*) show examples of packet switching methods.
Figure 2B:
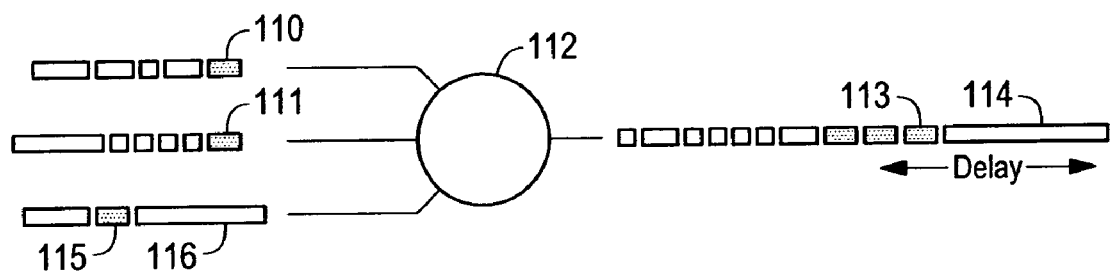
Figure 2C:
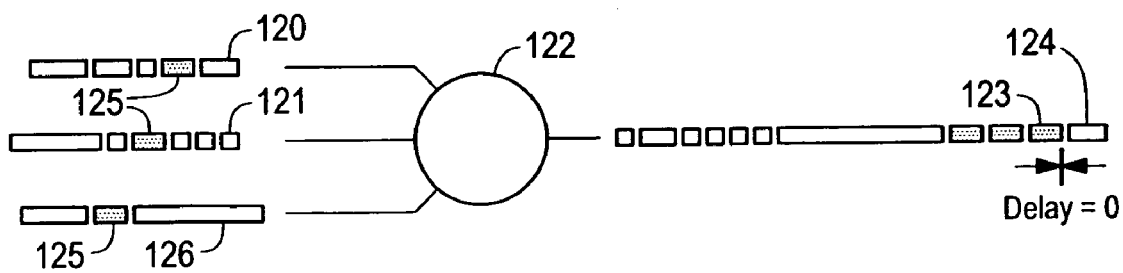

FIGS. 2(*a*), 2(*b*) and 2(*c*) illustrate the three technical approaches for switching packet data. These three technical approaches include two prior techniques and one new technique, as disclosed herein. For the purposes of this description all switching is assumed to be of a "cut-through" type. This means that a switch may begin forwarding a packet as soon as the switch begins reception of the packet. Packets do not have to be completely received before the switch begins retransmission. Cut-through switches have the advantage that the transit times do not need to accumulate. This means that a packet is already being transmitted to its destination while the end of the packet is still being received on an input port.

In previous systems, packets are switched in a FIFO, or First In First Out method. This is depicted in FIG. 2(*a*). FIFO is used today in most packet networks. FIG. 2(*a*) shows a packet switch 101 with three input streams of packets. In the packet switch 101, packets are transmitted in the order in which they are received. As shown in FIG. 2(*a*), a first packet received 105 is the first transmitted 103. A second packet received 100 is similarly the second sent, and so on. Real-time packets are shown as shaded packets, including packets 104 and 102. Significantly, due to the order in which the packets were received, and the FIFO nature of the switch 101, the real-time packet 104 is the last packet transmitted 102. This is because, for purposes of illustration, all of the other packets were received by the switch 101 before or simultaneous to reception of the packet 102. Consistent with this behavior, packets traversing networks of standard FIFO switches suffer from unpredictable delays. These delays accumulate and are often very long.

The most common technique proposed for mitigating such delays is shown in FIG. 2(*b*). In this approach the packets each are associated with a priority tag or label. When the switch receives a packet it checks the priority tag. If another packet of higher priority is already queued, the switch will send the higher priority packet first. Otherwise the switch will send the oldest packet of equivalent priority. In this way long waits in packet FIFO queues can be reduced.

Priority-based packet handling does not eliminate delays. In the example shown in FIG. 2(*b*), in the case where a long, low priority packet 116 is received first, it begins transmission. Shortly after it begins reception, higher priority packets 110 and 111 are received. These higher priority packets must wait for the completion of the lower priority packet's transmission first, since packet transmission, once begun cannot normally be interrupted. Also note, that the high-priority packets 110, 111 and 115 are also delayed by each other. Since they are of equal priority, they will have to wait in a FIFO, for other packets.

The present schedule-based packet processing is depicted in FIG. 2(*c*). Schedule-based processing is a new form of processing enabled by the scheduling system disclosed herein. In a schedule-based system, the real-time packets 125 do not arrive at the switch at the same time. Instead they are scheduled at the endpoints so that they will arrive at different times. As in the other examples, other packets arrive sooner such as the long packet 126. However, the schedule-based switch does not transmit the longer packet 126 because it has prior knowledge via a schedule of the imminent arrival of a new real-time packet. Instead it transmits a shorter received packet 120, shown as transmitted packet 124, because it has room to do so prior to the schedule. When the first real-time packet arrives it can then be immediately forwarded as shown by transmitted packet 123. The disclosed schedule-based processing can thus forward packets with essentially no queuing delay.

Figure 3:
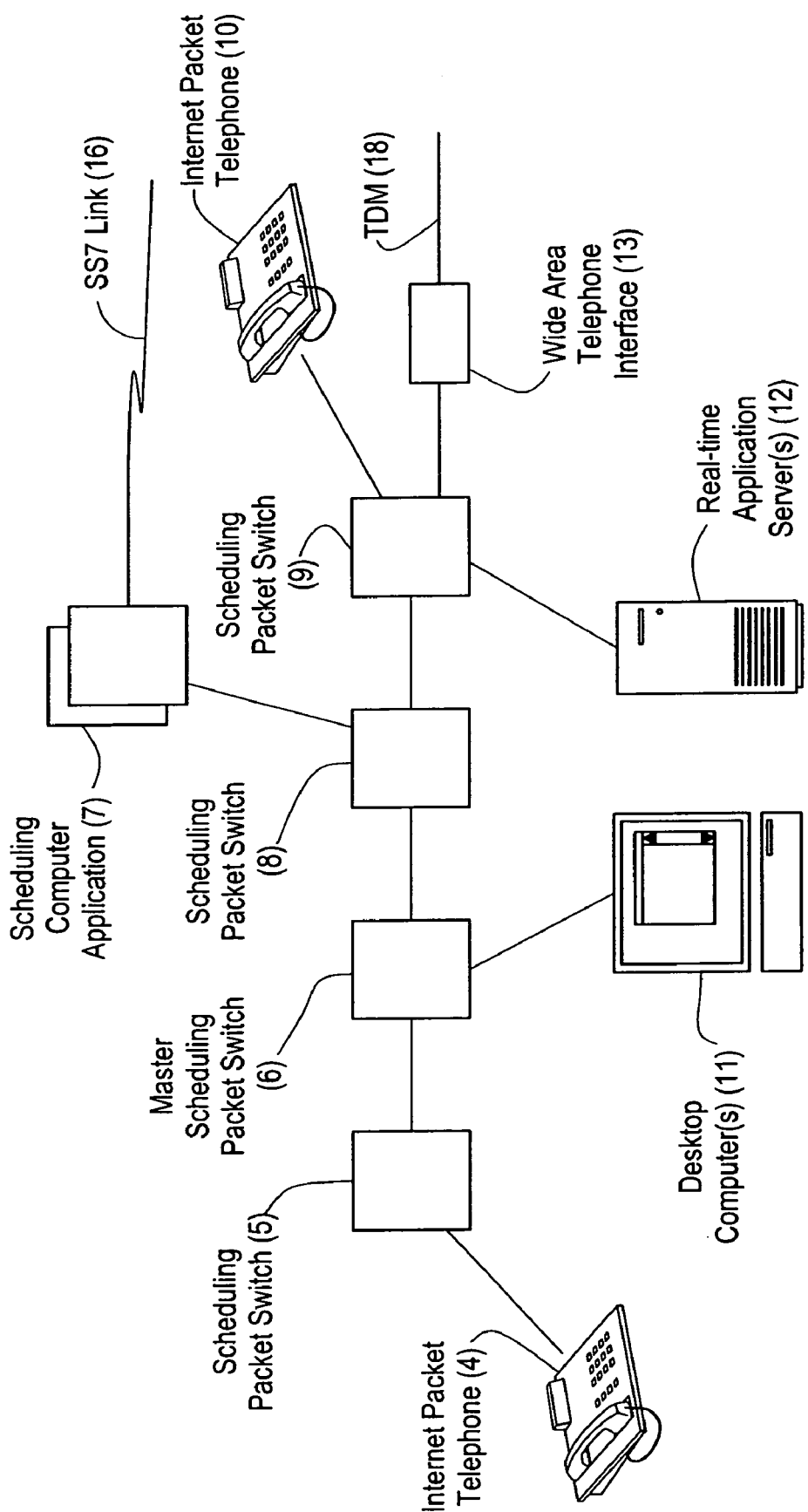
FIG. 3 shows an illustrative network of scheduled switches.

FIG. 3 illustrates a typical schedule domain. In the schedule domain shown in FIG. 3, one switch is designated a "master". Specifically, the master scheduling packet switch 6 operates to originate heartbeat packets. The other scheduling switches 5, 8 and 9 will receive heartbeat packets. Scheduling switches 5, 8 and 9 will compute their own reference values based on the arrival time and contents of the heartbeat packets, for example, using an averaging algorithm, and then distribute the heartbeat packets further. In the case of the scheduling switch 5, it will forward heartbeat packets to the host shown as the Internet Packet Telephone 4. In the case of the scheduling switch 8, it will forward heartbeat packets to the scheduling switch 9, and so on.

Only hosts which make real-time transmissions will need to make use of the heartbeat packets they receive. Hosts which need only to receive guaranteed packets, do not need to maintain a time reference to the switch. Such hosts may simply discard the heartbeat packets they receive. If a switch determines that no scheduled transmission capability is present on a port, it may elect not to send the heartbeat packets out of that port.

The embodiment of FIG. 3 depicts a typical real-time application operational environment for the scheduled switches shown therein. In FIG. 3, the real-time application shown is packet-based voice telephony. FIG. 3 shows scheduled switches 5, 6, 8 and 9, telephony hosts 4 and 10, desktop computer host 11, server(s) 12, and the real-time schedule server for telephony 7. The real-time schedule server 7 is shown coupled to an Signaling System 7 (SS7) link 16. Thus FIG. 3 is representative of a typical network as well as a typical real-time application.

The real-time telephony application in FIG. 3 supports several different types of sessions. First, a telephone 4 may establish a session with another telephone 10, or with other telephones attached to the switches 5, 6, 8 and 9. Second, the telephone 4 may establish a session with a remote telephone that is not on the scheduled switch network. This is accomplished by establishing a session with the wide area telephone interface 13 connected to a TDM link 18. The wide area telephone interface 13 will establish a connection to the distant telephone. Third, a telephone may communicate with any other telephone that is attached to a different switch. This may be accomplished using the inter-switch LAN link. Fourth, a telephone may establish a session with a server 12. This may be useful for retrieving voice messages or to access a voice response system. Fourth, a telephone may establish a session with a distant telephone that is connected to a packet-switched data service, such as the internet. This is accomplished via a session established with a wide area internet or data interface. Finally, a desktop computer 11, if supplied with the appropriate components to support the real-time application, such as voice, may also establish and accept real-time sessions.

Hosts such as those depicted in FIG. 3 will establish real-time sessions by communicating with the real-time scheduling server 7. The scheduling server 7 will provide all of the scheduling functions needed to control the interoperation of all real-time hosts. The hosts do not communicate directly with the switches 5, 6, 8 and 9. It is the function of the scheduling server 7 to coordinate the establishment of real-time sessions with the switches 5, 6, 8 and 9.

Sessions are established and ended in the following manner: The host makes a request by sending a message to the scheduling server 7. The message is sent using the conventional LAN-WAN-IP unscheduled connection. The scheduling server 7 computes the path between the requesting host and the packet destination, over which the new packet flow is to be established, or has already been established. The scheduling server 7 then transmits schedule information to the telephones 4 and 13, and to the switches 5, 6, 8 and 9. The schedule information message packets are received by the switches 5, 6, 8 and 9 and forwarded to the appropriate output ports at each switch. The switch management CPU 64 (FIG. 1) processes the contents of the schedule information packets in order to manage the real-time transmissions and receptions handled by each switch.

Figure 4:
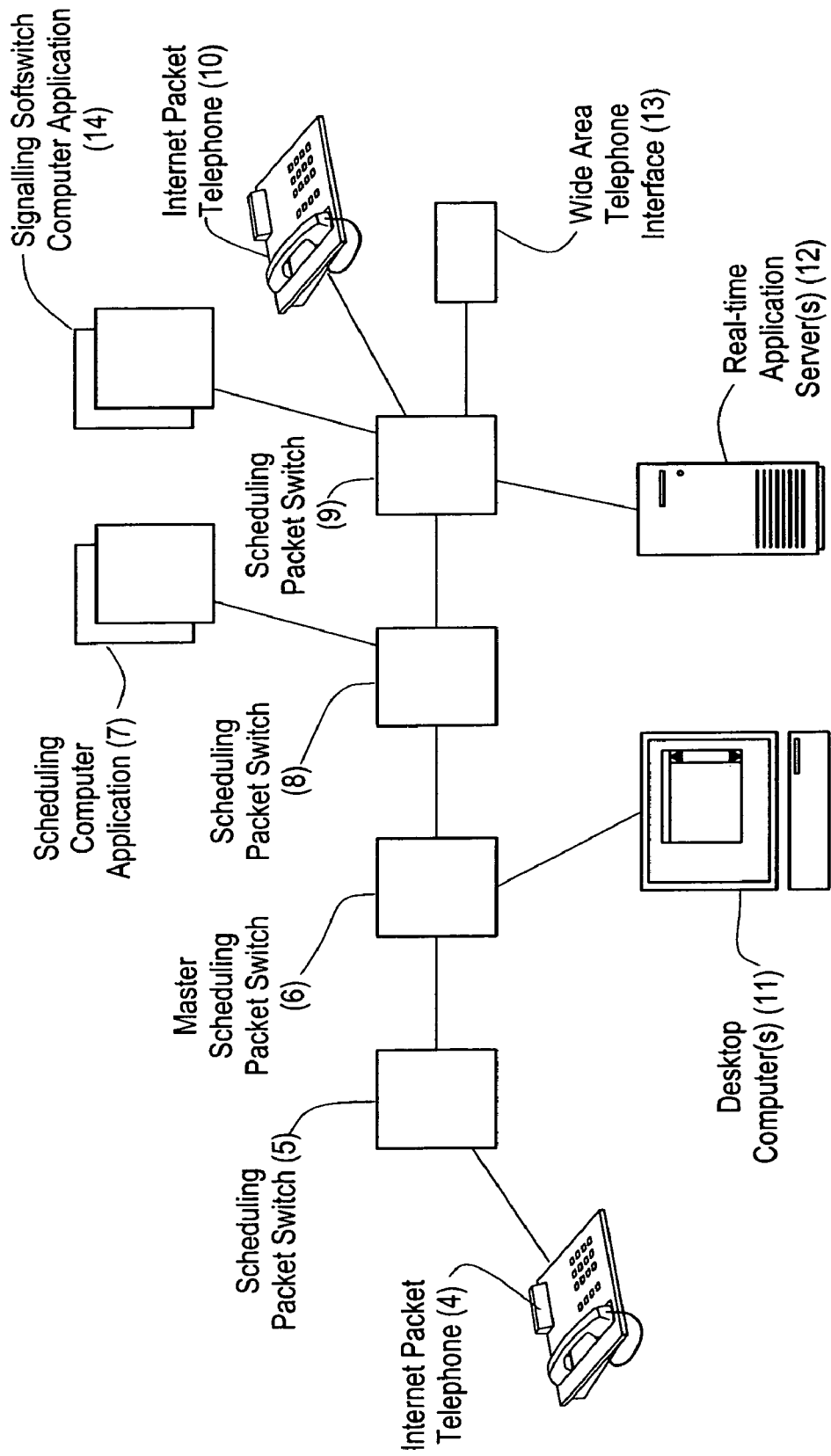
FIG. 4 shows an illustrative network scheduled switches together with a signaling softswitch.

FIG. 4 illustrates a network of scheduled switches including a signaling softswitch computer application 14. The devices in FIG. 4 are the same as those shown in FIG. 3, with the addition of the signaling softswitch computer application 14. The softswitch computer application 14 is a conventional software component which provides call signaling to hook up a phone call over the Internet. During operation of the network shown in FIG. 4, sessions are established and ended in the following manner: The host makes a request by sending a message to the signaling softswitch computer application 14. The signaling softswitch computer application 14 then requests a scheduled packet flow through the scheduling server 7. The rest of the operation of the devices shown in FIG. 4 is the same as that described for FIG. 3.

Figure 5:
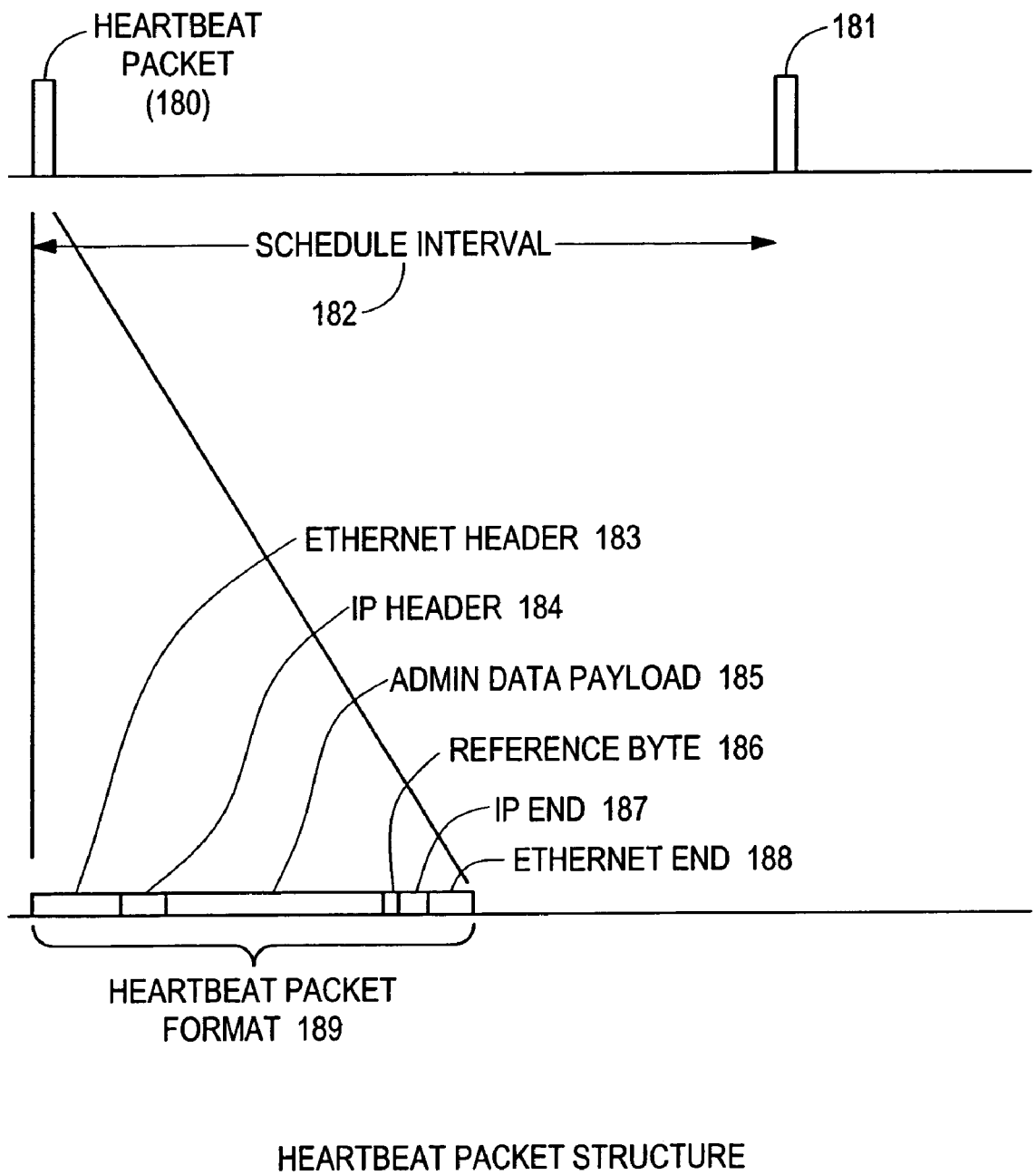
FIG. 5 shows the occurrence of a heartbeat signal within a schedule interval together with an illustrative heartbeat packet structure.

FIG. 5 shows a schedule interval 182 initiated by a heartbeat packet 180, and followed by a second heartbeat packet 181. For a typical real-time application, a heartbeat signal such as the heartbeat packets 180 and 181 could be sent as often as the schedule interval 182 itself. However, the heartbeat signal does not need to be sent at every interval, since the valid heartbeat packet arrival times may be averaged. Such averaging allows the schedule interval timing to be derived to an arbitrarily high accuracy.

An illustrative format 189 for a heartbeat packet is also shown in FIG. 5. In the illustrative heartbeat packet format 189 of FIG. 5, an Ethernet frame is used having a standard Ethernet or Internet Protocol (IP) packet. An Ethernet header 183 is shown preceding an IP header 184. A payload 185 is further shown, which may include a "time from last heartbeat" field, and is followed by a reference byte 186. An IP end field 187 and Ethernet end field 188 are also shown in FIG. 5. The reference byte 186 may be used by the receiver to obtain timing from the heartbeat packet shown in FIG. 5. Accordingly, when the receive control logic in a scheduled switch obtains a heartbeat packet it will search for the reference byte 186. When a scheduled switch obtains the reference byte 186 it will then reset its master clock 65 (FIG. 1) via an averaging computation performed by the SCC 43. Alternatively, timing information for a scheduled switch can also be obtained by timing the end, or beginning, or any other point within a received heartbeat packet, such as the heartbeat packet shown in FIG. 5, and then averaging that time. In such an alternative approach, the accuracy of the time reference will take more heartbeat packets to obtain an accurate lock.

Figure 6:
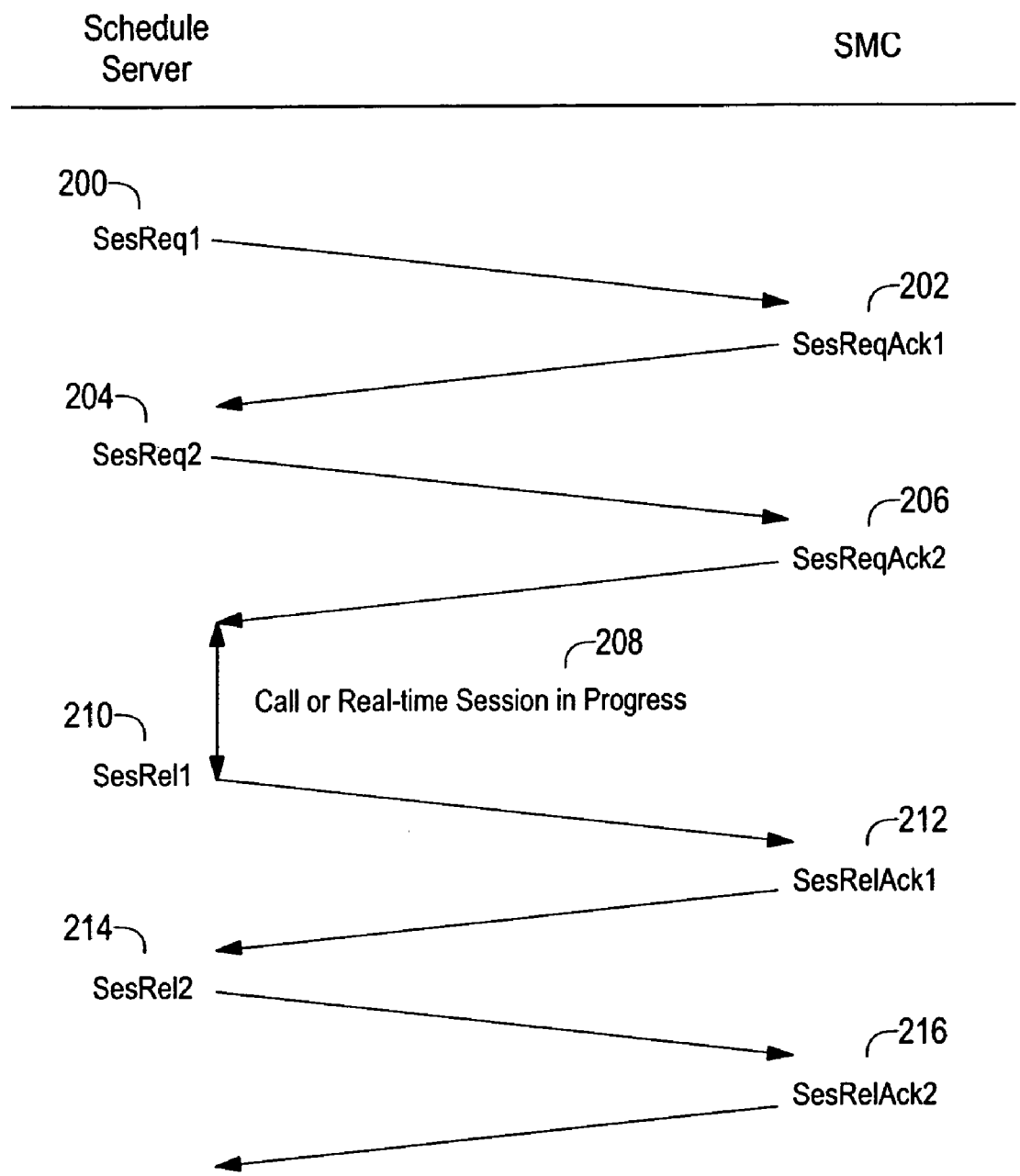
FIG. 6 shows the sequence of protocol messages for establishment and termination of a bi-directional real-time session.

FIG. 6 depicts a normal message exchange between a scheduling server and the SMC 64 within the switch 2 shown in FIG. 1. For a two-way session, the scheduling server 7 sends a first SesReq message 200 to the SMC 64. The SesReq message 200 informs the SMC 64 that a session schedule allocation is desired. The SesReq message 200 contains information regarding the desired session, such as the source and destination port numbers, the source and destination MAC addresses and the source and destination IP addresses, if available. The SesReq message 200 also contains the desired schedule configuration, for a real-time session, such as the number and size of packets.

The SMC 64 is further operative to respond to the SesReq message with a SesReqAck message 202. The SesReqAck message 202 indicates whether the session request is accepted. If the session request is accepted, then the session is established. For a bi-directional session, the SesReq message may be sent twice, once for each direction of packet flow. Alternatively, the schedule server can accept a single request for both directions. Accordingly, as shown in FIG. 6, a second SesReq message 204 is acknowledged by a second SesReqAck message 206. The call 208 then occurs in the event that both session packet flows are indicated as accepted.

Sessions are also discontinued with two messages sent from the schedule server. First, the scheduling server 7 sends a first SesRel message 210 to the SMC 64. The SesRel message 210 indicates to the switch that the time allocated within the schedule for the designated packet flow is no longer needed. The SMC 64 then responds with SesRelAck message 212. The SesRelAck message 212 indicates to the scheduling server 7 that the schedule resources associated with the designated session are now released. FIG. 6 also shows two session releases, as would be applicable to a bi-directional real-time application, such as a normal telephone call. Accordingly, a second SesRel message 214 is shown followed by a second SesRelAck message 216.

The internal operation of the switch 2 shown in FIG. 1 is now described, for the transport of real-time packets. As noted above, the switch 2 of FIG. 1 is operable to connect both real-time and non-real-time packet flows using the cross-point matrix 32. However, the cross-point matrix is used differently for real-time and non-real-time packets. Inside the switch 2, the SCC 43 maintains the crosspoint load memory 42. The crosspoint load memory 42 contains a complete state of the crosspoint matrix 32. The complete state of the crosspoint matrix 32 reflects the state of each packet flow schedule in the schedule interval.

Figure 7:
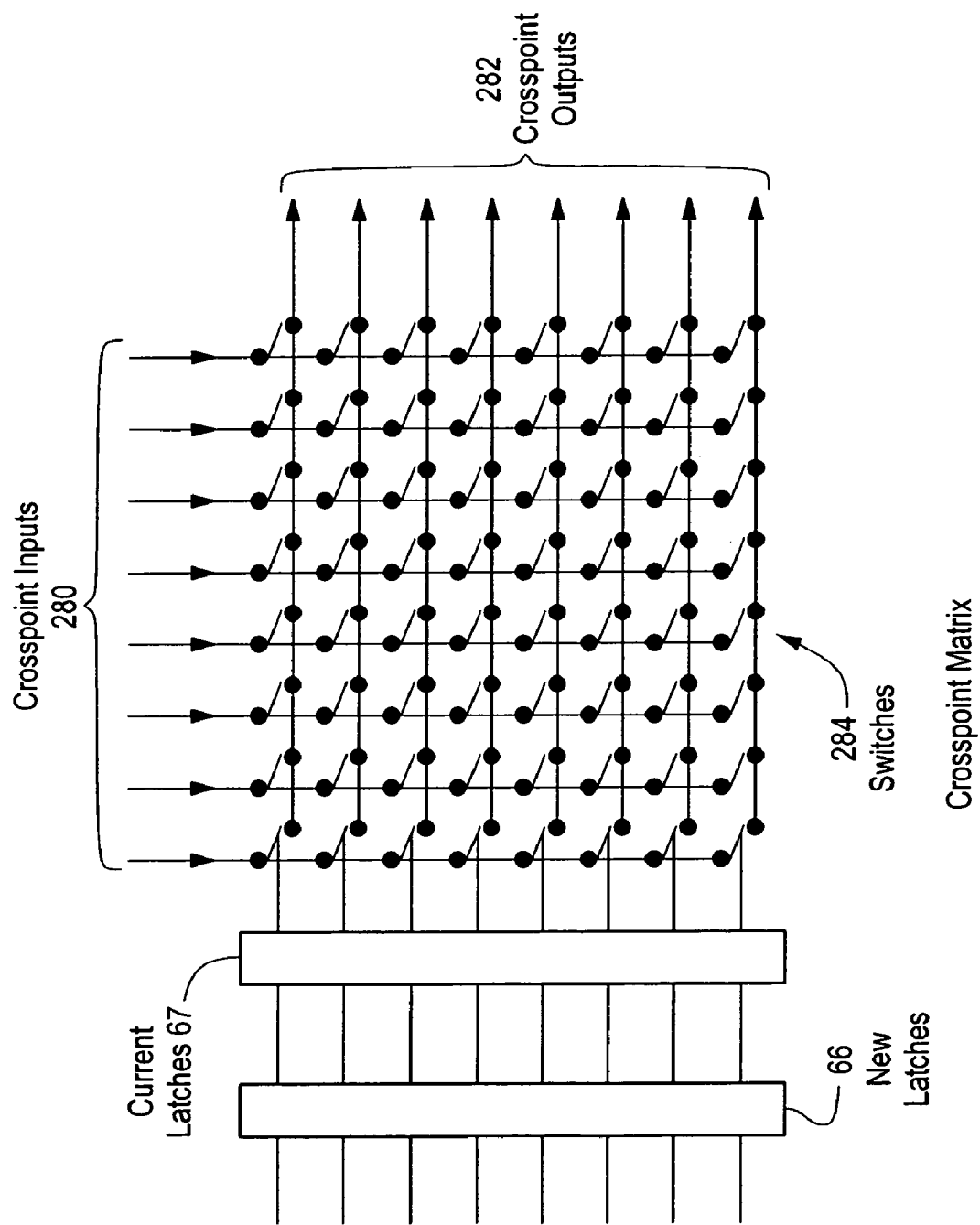
FIG. 7 shows an illustrative crosspoint matrix.

FIG. 7 shows an illustrative crosspoint matrix corresponding to the crosspoint matrix 32 shown in FIG. 1. The crosspoint matrix of FIG. 7 is shown including a number of switches 284 for connecting various ones of the crosspoint inputs 280 to various ones of the crosspoint outputs 282.

As shown in FIG. 7, the crosspoint matrix includes a double series of latches: New 66 and Current 67 which are used to control the setting of the crosspoint switches. The state of the Current latches 67 directly controls the crosspoint matrix. The Current latches 67 determine which inputs to the crosspoint matrix are actually connected to which outputs of the crosspoint matrix. The Current latches 67 can be loaded in two ways. First, the SCC 43 can directly access a given latch and change its value, at any time. Second, all the Current latches 67 can be loaded simultaneously from the contents of the New latches 66. The Data from the New Latches 66 is transferred to the Current latches 67 simultaneously, based upon the assertion of the load control pin 68. The load control pin is connected to the SCC 43. The SCC 43 can assert the load control pin at any time. The SCC 43 can also access and load any given New latch.

For non-real-time packets, the SCC 43 processes connection requests on a packet-by-packet basis and establishes connections by directly writing to the appropriate crosspoint matrix Current latch. Conversely, real-time connection sessions are established by loading the New latches 66. At the beginning of each new schedule the New latches 66 are loaded into the Current latches 67, by the assertion of the load control pin 68. During the course of the schedule, the CP configuration, for setting the switches, for the next packet flow schedule period, will be loaded to the New latches 66. The contents of the New latches 66 do not affect the operation of the crosspoint matrix until the load control pin 68 is asserted. This way, the switch configuration is ready for immediate set-up, at the moment the new schedule starts.

Both the Current latches 67 and the New latches 66 have one bit for each potential connection across the crosspoint matrix. In an illustrative embodiment, the switch 2 is capable of supporting 128 ports. Multiple external ports can be serviced by a single port on the crosspoint matrix. As shown in FIG. 7, an illustrative crosspoint matrix includes 128 inputs and 128 outputs. Each input can be connected to any output(s). There are 128 SPST (Single Pole Single Throw) switches for each output. Each of the 128 switches is attached to a different input. Only one input may be connected to a given output. Otherwise there would be contention and damage to the crosspoint matrix could result. It is possible to connect one input to one or all outputs. The memory required for each output is 128 bits. It is usually stored as 127 "zeros" with one "1" bit, which indicates the selected input line. If no input is selected then all 128 bits are "zero." The memory space required for 128 bits is 16 bytes.

When the SCC 43 receives a connection request from a port RCL, it must perform several functions. First, the SCC 43 checks to determine if the port to which a connection was requested is busy. The SCC 43 does this by checking the real-time connection memory, for each relevant schedule. It must also check the non-real-time connection memory. If the memories show that there is no connection active then the SCC 43 will set the non-real-time memory and then make the change to the appropriate CP register. The SCC 43 will then signal the requesting RCL to send its packet. When the SCC 43 receives a message from the RCL indicating completion of the packet transmission, then the SCC will clear the non-real-time memory and reset the connection via an appropriate crosspoint matrix register. If the SCC 43 receives a packet connection request from a port RCL and determines that the port to which a connection was requested is busy, then the connection request will be placed in a connection queue until the connection has been completed.

HIGH SPEED PROCESSOR EMBODIMENT

While the functionality provided in the switch 2 of FIG. 1 is predominantly provided by hardware components, such functionality may alternatively be provided using software or firmware executing on one or more high speed processors. In such an embodiment, the disclosed scheduling packet switch is implemented using an architecture illustrated in FIG. 8. In such an embodiment, the disclosed switch is built with a number of high speed processors 302, 303, which are optimized to operate on Ethernet and/or Internet Protocol packets, called "network processors" or "communications processors". These network processors 302, 303 are used to direct the flow of packets through the switch.

Figure 9:
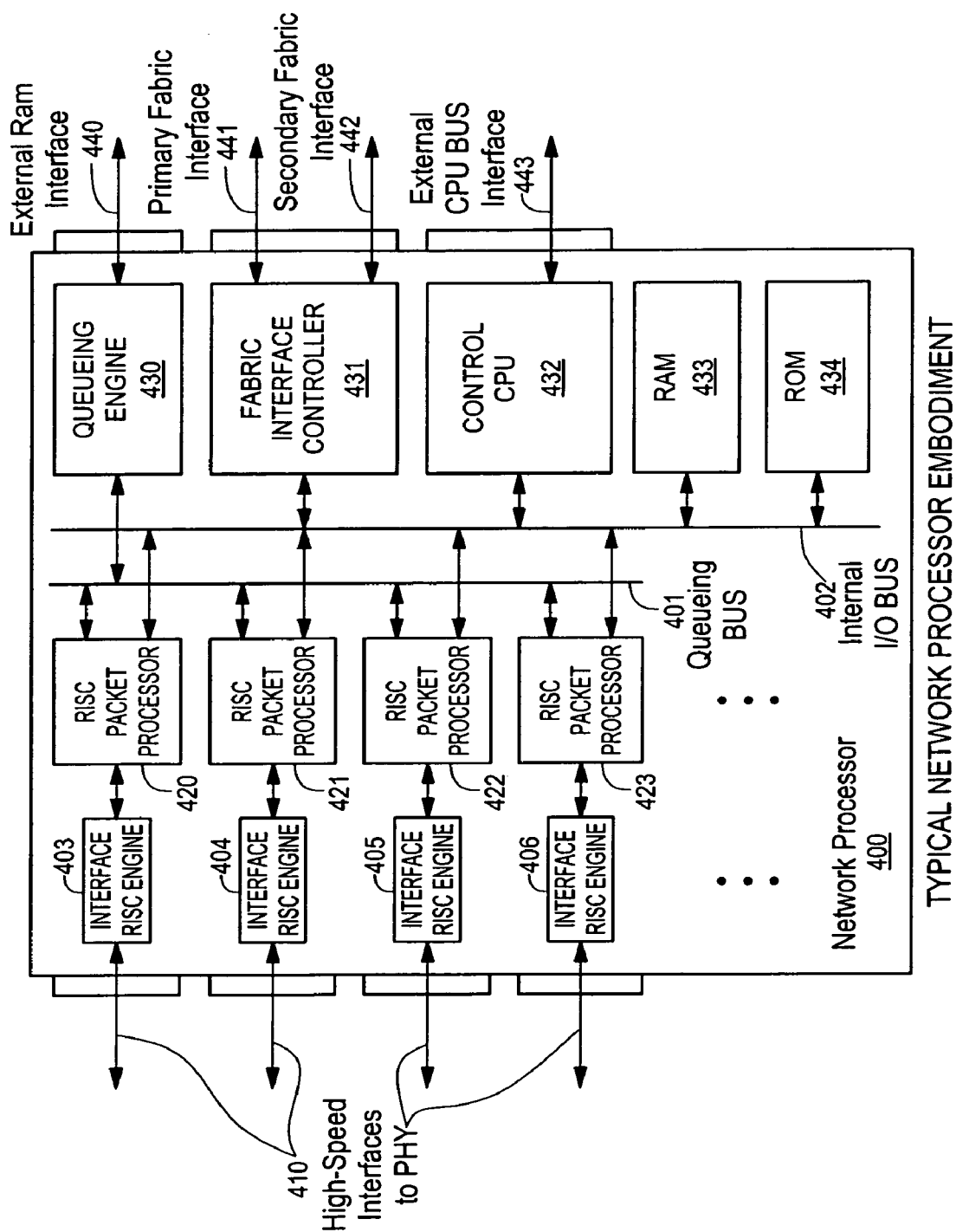
FIG. 9 further illustrates an embodiment of a network processor.

The internal construction of a typical network processor suitable for this application is shown in FIG. 9. In FIG. 9 the network processor 400 is shown as an integrated circuit with a variety of sub components. Packets typically enter and leave the network processor via high-speed interfaces 410. These interfaces can be configured as Ethernet or SONET or T-Carrier interfaces by means of a programmable RISC (Reduced Instruction Set) interface engine 403, 404, 405, 406, etc. The operating configurations of the RISC engines, are set by the Control CPU 432. The Control CPU 432 will typically load some micro-code into the RISC Engine upon start-up of the network processor 400.

The RISC Engines 403, 404, 405, 406, etc. will format the incoming data on the high-speed interface to extract the packet data from the framing data. This data is sent to the RISC packet processor 420, 421, 422, 423, etc. Likewise on transmit, the packet data leaves the RISC packet processor and is formatted by the interface RISC engines 403, 404, 405, 406, etc.

The packet processors 420, 421, 422, 423, etc. are used to make a determination of packet destination. They can place a packet on a queue, or send it to another packet processor for transmission. The queuing engine 430 is used to manage the queues. Each packet processor 420, 421, 422, 423, etc. can have multiple queues, for both transmit and for receive. The packet processor will determine which of its queues to place the packet in and then send it to the queuing engine 430 for storage. The Queuing engine 430 will then use external high-speed RAM via a high-speed RAM interface 440 to store the packet.

If the packet processor 420, 421, 422, 423, etc. determines that the packet should be transmitted to another packet processor, then the packet processor will transfer the packet to the fabric interface controller 431. This interface will then transfer the packet, along with the address of the destination network processor and the port of the destination network processor. The switch fabric 308 then moves the packet to the fabric interface controller 431 of the next network processor. A typical switch may have many ports 410, on many network processors 420, 421, 422, 423, etc.

The control CPU 432 will control the operation of the components of the network processor 400. This includes the interface RISC engines, the RISC Packet Processors 420, 421, 422, 423, etc., queuing engine 430, and the fabric interface 431. It communicates with an external CPU 314, 315, etc. via a bus 443. The control CPU will also make use of the internal RAM 433 and ROM 434 to conduct its operation.

Figure 8:
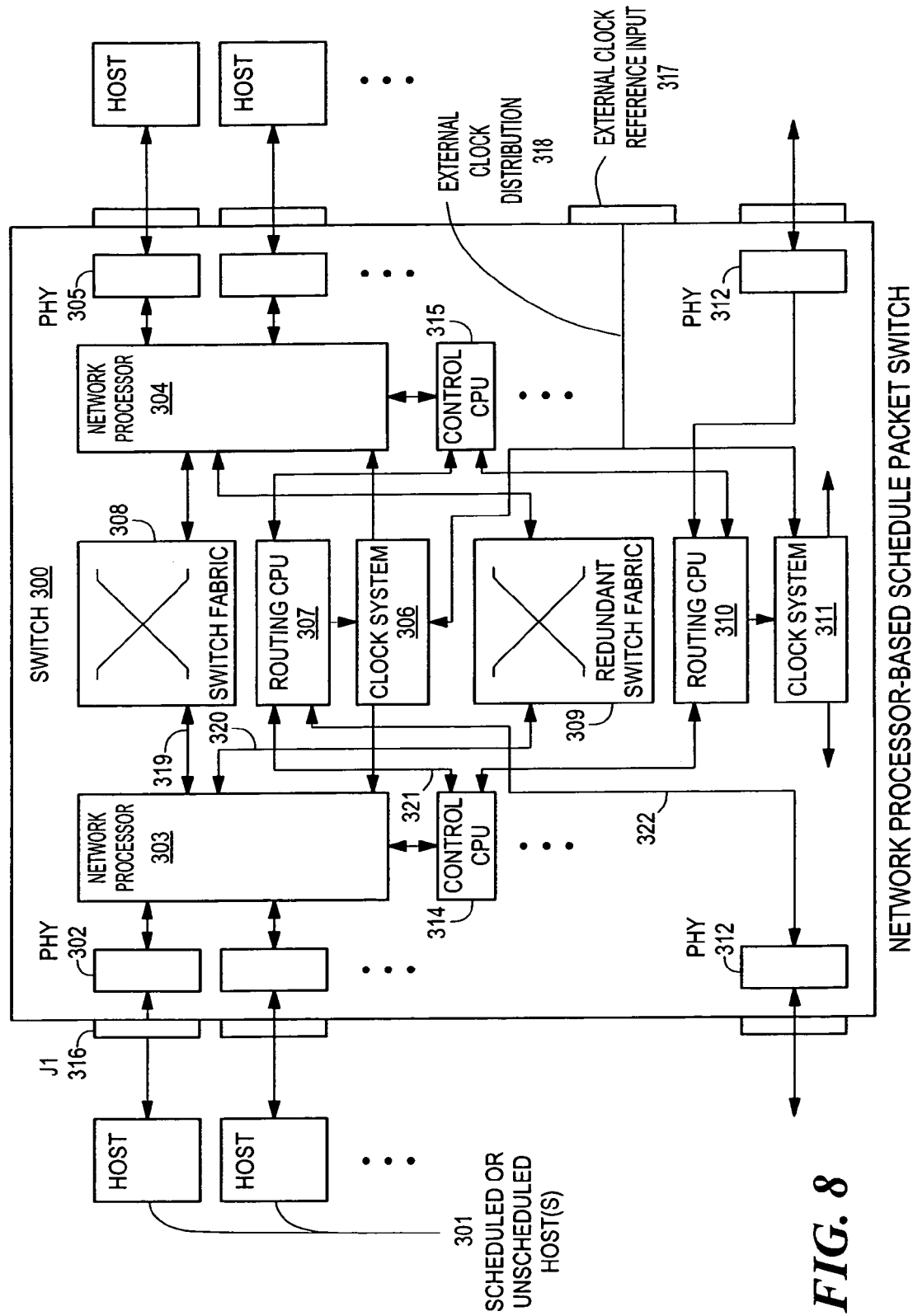
FIG. 8 shows an illustrative network processor-based scheduled packet switch.

In the switch 300, illustrated in FIG. 8, multiple network processors 303, 304, etc. are used, in conjunction with the switch fabrics 308, 309 to move packets in and out of the switch 300. Packets enter the switch into physical layer devices 302. These devices convert the signal levels, impedance and media (optical, electrical, balanced, unbalanced, etc.) into signals that can be interfaced to the network processors 303, 304, etc. The hosts 301 will send and receive packet data to and from the switch 300. This packet data can be either scheduled or unscheduled.

The switch operation is controlled via a routing CPU 307, 310. The routing CPU 307, 310 communicates with other packet switches in order to learn the topology of the network of switches. Then it provides routing information to the network processors 303, 304, etc. so that they can send the incoming packets to the proper output port.

This switch has the additional capability to survive a failure of the primary switch fabric 308, routing CPU 307 and clock system 306. Provision is made for a redundant switch fabric 309, routing CPU 310 and clock system 311. The network processors 303, 304, etc. can determine if the primary system has failed by examining the responses from the primary system. If a failure is detected, then the network processors 303, 304, etc. can switch over to use the redundant system. In a preferred embodiment, the primary and redundant processors are on separate removable cards. If a failure is detected, then the failed card may be replaced without loss of operation of the switch 300.

Packet flow schedules are delivered to the switch via messages to the routing CPU 307, 310. Both CPUs (primary and redundant) 307, 310 will receive the schedule and routing information. Only the primary routing CPU 307 will act upon it unless the redundant CPU 310 is engaged. The schedule information is then transferred to the appropriate network processor. If a schedule is removed or cancelled, then the schedule information is erased in a similar manner.

Unscheduled ("Normal") packets enter the switch are processed by the network processors 303, 304, etc., and are placed on queues as needed. Packets are then transferred to the switch fabric (308) back to network processors 303, 304, etc. for transmission to their eventual destination. Queues can be organized by order of arrival, by priorities, or by tag as in Multi-protocol Label Switching (MPLS). Unscheduled packet traffic will be subject to the normal delay variations caused by the interplay between the streams of packets and the various queuing systems in the switch.

Scheduled packets are transferred (switched) in a different manner. The network processor 303, 304, etc. is given a schedule by the routing CPU 307. The network processor 303, 304, etc. will check the schedule as each new packet is received. If the network processor 303, 304, etc. determines that a schedule is in effect then it can directly forward the packet to the switch fabric, with information for the fabric, for the destination network processor 303, 304, etc. and the destination port. Likewise, on the transmit side of a network processor 303, 304, etc., the processor will continually check its schedule. If a particular schedule is in effect, then the network processor will not transmit a queued packet but will instead directly forward a packet currently being received via the fabric interface 319.

Figure 10:
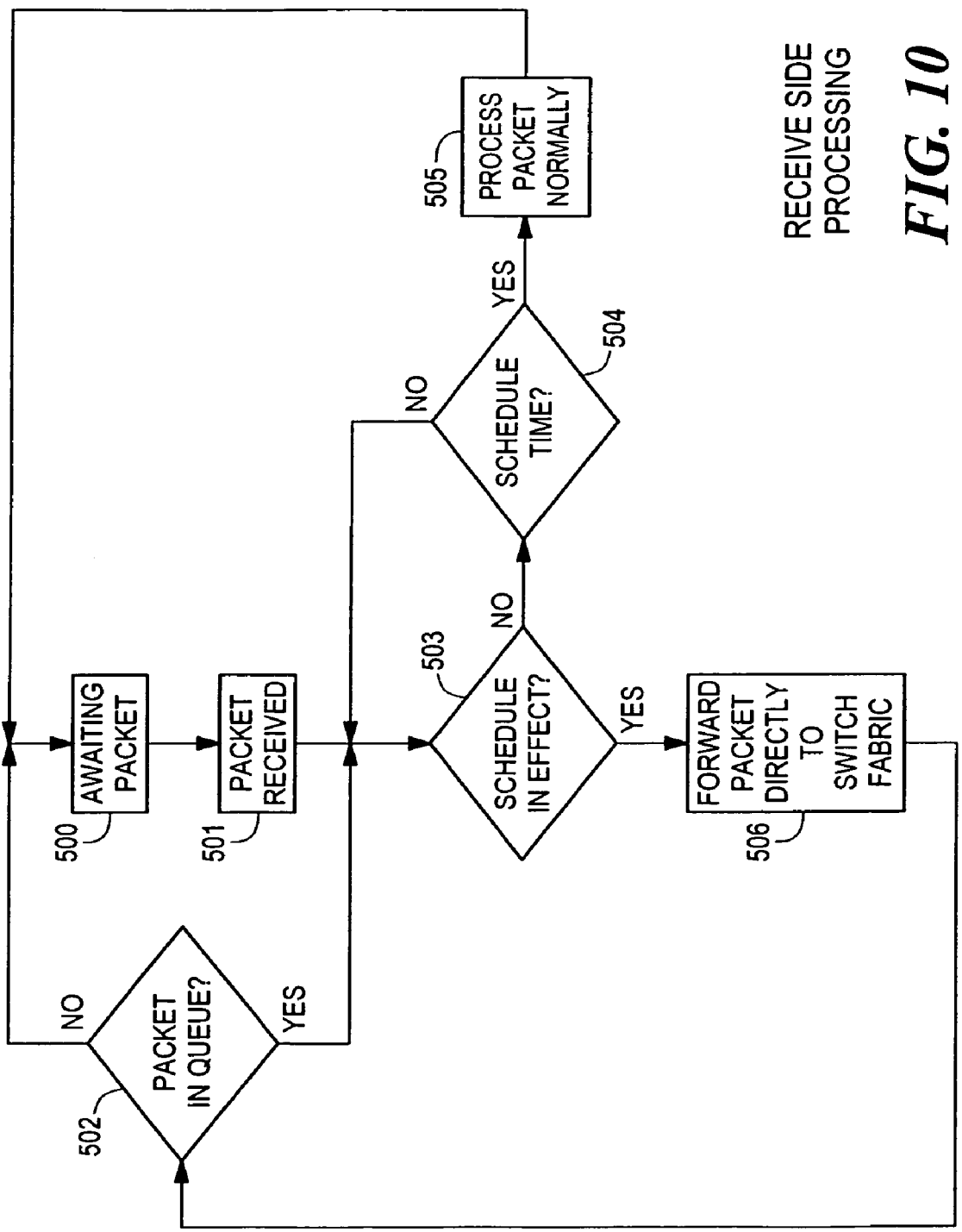
FIG. 10 shows steps performed during receive side processing in an illustrative embodiment.
Figure 11:
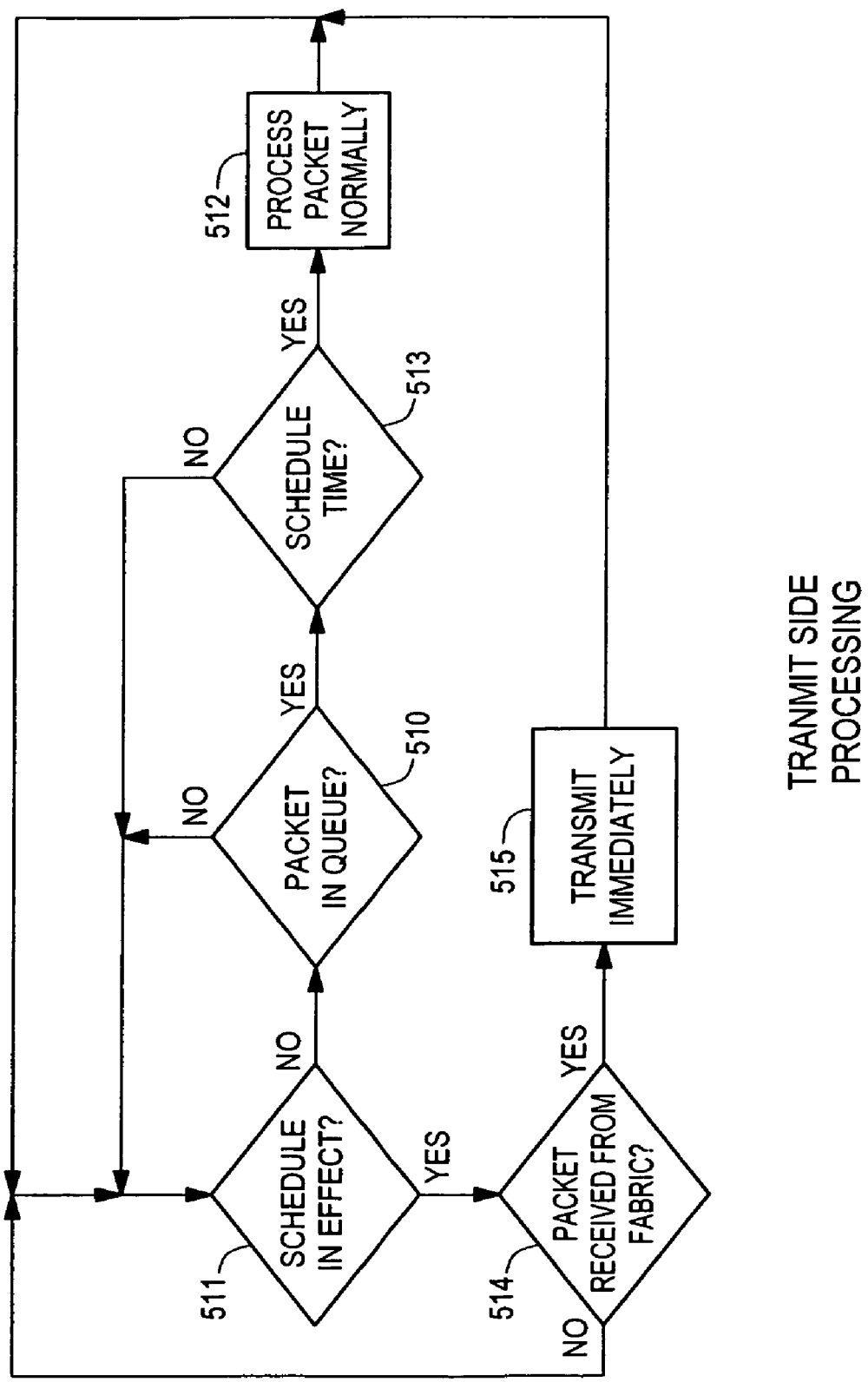
FIG. 11 shows steps performed during transmit side processing in an illustrative embodiment.

In this way, the scheduled packets will be forwarded through the switch in an expedited and predictable manner. The flow charts for this operation are illustrated in FIGS. 10 and 11. Receive side processing is depicted in FIG. 10 and transmit side processing is depicted in FIG. 11.

As shown in FIG. 10, the network processor waits for a packet, in its awaiting packet state 500. When a packet is received 501, the processor then queries the schedule information to determine if the received packet is governed by a schedule. If the answer is "YES" then the packet is forwarded directly to the switch fabric 506. When this transfer is complete, the processor will check for another packet 502. If one is not present then the processor will return to the awaiting packet state 500. If a packet is present the processor will check again for relevant schedule information schedule at step 503. Here again, if a schedule is not in effect then the processor will check to determine if there is sufficient time to forward the next packet at step 504. If the answer is "NO" then the processor will again check for relevant schedule information at step 503. If the answer is "YES" then the processor will forward the unscheduled packet normally at step 505. It will then return to the awaiting packet state 500. With this process receive processing can insure that all scheduled packets receive expedited processing. It can also insure that no unscheduled packet processing will interfere with an upcoming scheduled packet. Finally, it allows awaiting unscheduled packets to be transmitted just ahead of an imminent scheduled packet.

Transmit side processing is implemented in a similar fashion. FIG. 11 illustrates the transmit process. The transmit side network processor continuously checks for a schedule at 511. If a schedule is in effect then the transmit process will wait for the scheduled packet to arrive from the fabric 514 and transmit it as soon as it arrives at 515. Then the processor can again check for schedule at 511. If no schedule is in effect, the network processor may send unscheduled packets. It must first check for such a packet at 510 and if present it must also check for time to send at 513. If a packet is too long to send completely, prior to the next schedule, then the network processor will wait and not send it. If the packet can fit in the remaining time, prior to a new scheduled packet, then the packet may be sent normally at 512.

A simple example of a real-time application to which the present invention may be applied is voice telephony. In this example, a conventional voice telephone call signal is transmitted through the telephone network, between two telephone instruments. As it is generally known, telephone networks are normally designed to deliver a guaranteed bit rate of 64 kilobits per second (8,000 eight bit samples, per second), at an error rate of less than one corrupted voice sample in 12,500, with a fixed delay that does not exceed 100 milliseconds worldwide.

To transmit real-time voice data through the disclosed scheduled network, digitized voice samples are accumulated at an 8 kilohertz rate, into packets. For example, a common accumulation period would be 20 milliseconds. If samples are accumulated over a 20 millisecond period, each period will accumulate 80 samples. These 80 samples are then be placed in an Internet packet and transmitted. A new packet would be transmitted every 20 milliseconds. The disclosed system would coordinate a schedule with a transmitting telephone, the first switch, and every succeeding switch over the path to the receiving telephone. Finally, the last switch in the path sends the packets to the receiving telephone.

The packet flow schedule for this telephone call might, for example, be defined based on a total schedule interval length of 20 milliseconds, a packet flow offset description defining the start of a packet within the schedule interval (this would be a number of sufficient resolution between 0 and 20), and a packet length (in this case this would be more than 80 bytes, in order to allow for the packet and IP overhead).

This packet flow schedule is computed and delivered to each switch along the path to the receiving telephone. The packet flow offset will be different for each switch. The schedule interval length would generally remain the same. The packet length will also remain the same. The position of the packet in the interval changes from one switch to another, because the packet will take time to traverse the network, from switch to switch. Switches will insert delay. Transmission between switches will also cause delay. These delays must be accounted for in the computation of the packet flow schedule.

When a scheduled telephone call is initiated, the schedule server application computes the necessary packet flow schedule. The schedule application then communicates the schedule information to the transmitting telephone and to all the switches along the path for that packet flow. When the call is complete, the schedule server informs all of the switches along the path to discard the schedule.

An important advantage of this invention is that packet delay need not accumulate over multiple switches. Since multiple switches can have their schedules coordinated, it is now possible to transmit the same telephone call packets, through multiple switches, over long distances. In this case the only delays that are added are those related to physical distance and the packet forwarding process. This is in distinct contrast to existing "best-efforts" or unscheduled packet switching systems. When unscheduled packets flow through a network, they can easily encounter momentary congestion or queue overflows, resulting in unpredictable delay or loss.

Those skilled in the art should readily appreciate that programs defining the functions of the present invention can be delivered to a computer in many forms; including, but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method for switching data packet flows with guaranteed delay and bandwidth, comprising:

receiving expected packet arrival time information at a switch, wherein said expected packet arrival time information is associated with a packet flow, and wherein said expected packet arrival time information indicates an expected packet arrival time at which at least one packet associated with said packet flow is expected to be received by said switch;

storing, within said switch, schedule information defining at least one packet flow schedule, wherein said schedule information defines scheduled reception and transmission times for at least one packet associated with said at least one packet flow, wherein the scheduled reception time indicates an expected packet arrival time at which said at least one packet associated with said at least one packet flow is expected to be received by said switch;

receiving forwarding information associated with said packet flow, wherein said forwarding information indicates how said switch should forward a packet that arrives at said expected packet arrival time, and associating said forwarding information with said expected packet arrival time;

receiving a reference packet at a reference time;

determining a schedule interval start time in response to said reference time;

determining said expected packet arrival time based on said expected packet arrival time information and said schedule interval start time;

pre-establishing a path through said switch for a predetermined period of time that includes said expected packet arrival time;

receiving a packet at said expected packet arrival time;

subjecting said packet to a layer 2 processing or a higher layer processing, said layer 2 processing or a higher layer processing including at least one of switching said packet and routing said packet; and forwarding, via said pre-established path through said switch, said packet based on said forwarding information associated with said expected packet arrival time.

2. The method of claim 1, further comprising:

receiving packet transmission time information at said switch, wherein said packet transmission time information is associated with said packet flow, wherein said packet transmission time information indicates a packet transmission time at which said switch may transmit said packet associated with said packet flow; and wherein said forwarding said packet includes transmitting said packet at said packet transmission time.

3. The method of claim 2, further comprising:

associating said expected packet arrival time information with a first port of said switch; and wherein said receiving of said packet is at said first port of said switch.

4. The method of claim 3, further comprising:

associating said packet transmission time information with a second port of said switch; and wherein said transmitting of said packet is at said second port of said switch.

5. The method of claim 4, further comprising:

wherein said packet flow is associated with a real-time application;

receiving another packet associated with a non-real-time application; and delaying transmission of said non-real-time packet in order to perform said transmitting of said packet associated with said real-time application.

6. The method of claim 5, wherein said receiving of said packet associated with said non-real-time application occurs prior to said receiving of said packet associated with said real-time application.

7. The method of claim 1, wherein said expected packet arrival time information includes a packet flow offset value, and wherein said determining said expected packet arrival time includes adding said packet flow offset value to said schedule interval start time.

8. The method of claim 1, wherein said packet transmission time information includes a packet flow offset value, and wherein said determining said packet transmission time includes adding said packet flow offset value to said schedule interval start time.

9. The method of claim 2, further comprising:
transmitting said packet transmission time information to a second switch; and
receiving acknowledgement of said packet transmission time information, wherein said acknowledgement of said packet transmission time information includes either approval or disapproval.

10. An apparatus for switching data packet flows with guaranteed delay and bandwidth, comprising:
control logic for receiving expected packet arrival time information at a switch, wherein said expected packet arrival time information is associated with a packet flow, and wherein said expected packet arrival time information indicates an expected packet arrival time at which at least one packet associated with said packet flow is expected to be received by said switch;
control logic for storing within said switch, schedule information defining at least one packet flow schedule, wherein said schedule information defines scheduled reception and transmission times for at least one packet associated with said at least one packet flow, wherein the scheduled reception time indicates an expected packet arrival time at which said at least one packet associated with said at least one packet flow is expected to be received by said switch;
control logic for receiving forwarding information associated with said packet flow, wherein said forwarding information indicates how said switch should forward a packet that arrives at said expected packet arrival time, and associating said forwarding information with said expected packet arrival time;
control logic for—receiving a reference packet at a reference time;
control logic for determining a schedule interval start time in response to said reference time;
control logic for determining said expected packet arrival time based on said expected packet arrival time information and said schedule interval start time;
control logic for pre-establishing a path through said switch for a predetermined period of a time that includes said expected packet arrival time;
control logic for receiving a packet at said expected packet arrival time;
control logic for subjecting said packet to a layer 2 processing or a higher layer processing, said layer 2 processing or a higher layer processing including at least one of switching said packet and routing said packet; and
control logic for forwarding, via said pre-established path through said switch, said packet based on said forwarding information associated with said expected packet arrival time.

11. The apparatus of claim 10, further comprising:
control logic for receiving packet transmission time information at said switch, wherein said packet transmission time information is associated with said packet flow, wherein said packet transmission time information indicates a packet transmission time at which said switch may transmit said packet associated with said packet flow; and
wherein said control logic for forwarding said packet includes control logic for transmitting said packet at said packet transmission time.

12. The apparatus of claim 11, further comprising:
control logic for associating said expected packet arrival time information with a first port of said switch; and
wherein said control logic for receiving of said packet is associated with said first port of said switch.

13. The apparatus of claim 12, further comprising:
control logic for associating said packet transmission time information with a second port of said switch; and
wherein said control logic for transmitting said packet is associated with said second port of said switch.

14. The apparatus of claim 13, wherein:
said packet flow is associated with a real-time application; and further comprising:
control logic for delaying transmission of a received non-real-time packet in order to perform said transmitting of said packet associated with said real-time application.

15. The apparatus of claim 14, wherein said control logic for delaying said transmission of said received non-real-time packet is operable to delay said transmission of said received non-real-time packet in the event that said non-real-time packet is received prior to said receiving of said packet associated with said real-time application.

16. The apparatus of claim 10, wherein said expected packet arrival time information includes a packet flow offset value, and wherein said control logic for determining said expected packet arrival time includes control logic for adding said packet flow offset value to said schedule interval start time.

17. The apparatus of claim 10, wherein said packet transmission time information includes a packet flow offset value, and wherein said control logic for determining said packet transmission time includes control logic for adding said packet flow offset value to said schedule interval start time.

18. The apparatus of claim 11, further comprising:
control logic for transmitting said packet transmission time information to a second switch; and
control logic for receiving acknowledgement of said packet transmission time information, wherein said acknowledgement of said packet transmission time information includes either approval or disapproval.

19. A network of communication devices including a plurality of packet switching devices according to claim 11, and wherein a first subset of said plurality of switching devices are originators of reference packets including said expected packet arrival time information and said packet transmission time information, and a second subset of said plurality of packet switching devices are receivers of said reference packets including said expected packet arrival time information and said packet transmission time information.

20. A network of communication devices including a plurality of packet switching devices according to claim 11, and wherein a predetermined one of said plurality of switching devices operates as a centralized scheduling agent and originates reference packets including said expected packet arrival time information and said packet transmission time information.

21. A schedule-based packet switch, comprising:
a master clock system, said master clock system operative to determine a beginning of a schedule interval;
schedule information defining at least one packet flow schedule, wherein said schedule information defines scheduled reception and transmission times for at least one packet associated with said at least one packet flow, wherein the scheduled reception time indicates an expected packet arrival time at which said at least one packet associated with said at least one packet flow is expected to be received by said switch;

logic for subjecting said packet to a layer 2 processing or a higher layer processing, said layer 2 processing or a higher layer processing including at least one of switching said packet and routing said packet; and logic for receiving a reference packet at a reference time;

logic for determining a schedule interval start time in response to said reference time;

logic far determining said expected packet arrival time based on said expected packet arrival time information and said schedule interval start time;

a plurality of interface ports, each of said interface ports having transmit control logic and receive control logic, wherein each of said transmit and receive logic is responsive to said schedule information and said master clock system, wherein said transmit control logic of at least one of said plurality of interface ports is operable to determine a transmit time of a received packet associated with said at least one packet flow in response to a transmit time offset into said schedule interval defined by said packet flow schedule.

22. The schedule-based packet switch of claim 21, wherein said receive control logic of at least one of said plurality of interface ports is operable to determine an expected reception time of a packet associated with said at least one packet flow in response to a reception time offset into said schedule interval defined by said packet flow schedule.

23. The schedule-based packet switch of claim 21, wherein said master clock system is responsive to an external clock reference, wherein said external clock reference is based on a received heartbeat packet.

24. A method for schedule-based packet switching in a scheduled packet switch, comprising:

determining, by a master clock system in said scheduled packet switch, a beginning of a schedule interval;

storing, within said scheduled packet switch, schedule information defining at least one packet flow schedule, wherein said schedule information defines scheduled reception and transmission times for at least one packet associated with said at least one packet flow, wherein the scheduled reception time indicates an expected packet arrival time at which said at least one packet associated with said at least one packet flow is expected to be received by said scheduled packet switch;

determining, at a transmit control logic of an interface port of said scheduled packet switch, and responsive to said schedule information and said master clock system, a transmit time of a received packet associated with said at least one packet flow in response to a transmit time offset into said schedule interval defined by said packet flow schedule;

receiving a reference packet at a reference time;

determining a schedule interval start time in response to said reference time;

determining said expected packet arrival time based on said expected packet arrival time information and said schedule interval start time; and subjecting said packet to a layer 2 processing or a higher layer processing, said layer 2 processing or a higher layer processing including at least one of switching said packet and routing said packet.

25. The method of claim 24, further comprising determining, at a receive control logic of an interface port of said scheduled packet switch, and responsive to said schedule information and said master clock system, an expected reception time of a packet associated with said at least one packet flow in response to a reception time offset into said schedule interval defined by said packet flow schedule.

26. The method of claim 1, wherein:

said pre-establishing said path through said switch comprises establishing said path from a first port of said switch to a second port of said switch, according to said forwarding information.

27. The method of claim 26, further comprising:

after the predetermined period of time, disestablishing said path through said switch.

28. The method of claim 26, further comprising:

periodically re-establishing said path, from said first port to said second port, through said switch, for said predetermined period of time; and forwarding any received packets received at said first port, while said path is established, by transmitting said any received packets at said second port, in accordance with said forwarding information associated with said packet flow.

29. The method of claim 28, wherein:

said expected packet arrival time information further indicates a repeat time interval between packets that are associated with said packet flaw and that are expected to be received by said switch; and said periodically re-establishing said path comprises periodically re-establishing said path according to said repeat time interval.

30. The method of claim 1, wherein:

said expected packet arrival time information further indicates a repeat time interval between packets that are associated with said packet flow and that are expected to be received by said switch; and further comprising:

receiving subsequent packets at times corresponding to said expected packet arrival time and said repeat time interval; and forwarding said subsequent packets based on said forwarding information associated with said expected packet arrival time.

31. The method of claim 1, wherein:

said forwarding said packets comprises forwarding said packet without referencing destination information with said packet.

32. The apparatus of claim 10, wherein:

said control logic for pre-establishing said path through said switch comprises a crosspoint matrix communicably coupled to said control logic for receiving said packet and to said control logic for forwarding said packet and operable to establish said path, from a first port to a second port, through said switch, according to said forwarding information.

33. A network of communication devices including a plurality of packet switching devices according to claim 11, further comprising a centralized scheduling agent that originates reference packets including said expected packet arrival time information and said packet transmission time information.

34. A method for switching data packet flows with guaranteed delay and bandwidth, comprising:

receiving expected packet arrival time information at a switch, wherein said expected packet arrival time information is associated with a packet flow, and wherein said expected packet arrival time information indicates an expected packet arrival time at which at least one packet associated with said packet flow is expected to be received by said switch;

storing, within said switch, schedule information defining at least one packet flow schedule, wherein said schedule information defines scheduled reception and transmission times for at least one packet associated with said at least one packet flow, wherein the scheduled reception time indicates an expected packet arrival time at which said at least one packet associated with said at least one packet flow is expected to be received by said switch;

receiving forwarding information associated with said packet flow, wherein said forwarding information indicates how said switch should forward a packet that arrives at said expected packet arrival time, and associating said forwarding information with said expected packet arrival time;

receiving a reference packet at a reference time;

determining a schedule interval start time in response to said reference time;

determining said expected packet arrival time based on said expected packet arrival time information and said schedule interval start time;

pre-establishing a path through said switch for a predetermined amount of time, based on said expected packet arrival time;

receiving a packet during said predetermined amount of time;

subjecting said packet to a layer 2 processing or a higher layer processing, said layer 2 processing or a higher layer processing including at least one of switching said packet and routing said packet; and forwarding, via said pre-established path through said switch, said packet based on said forwarding information associated with said expected packet arrival time.

35. The method of claim 34, further comprising:

receiving packet transmission line information at said switch, wherein said packet transmission time information is associated with said packet flow, wherein said packet transmission time information indicates a packet transmission time at which said switch may transmit said packet associated with said packet flow; and wherein said forwarding said packet includes transmitting said packet at said packet transmission time.

36. The method of claim 34, wherein:

said pre-establishing said path through said switch comprises establishing said path from a first port of said switch to a second port of said switch, according to said forwarding information.

37. The method of claim 36, further comprising:

periodically re-establishing said path, from said first port to said second port, through said switch, for said predetermined period of time; and forwarding any received packets received at said first port, while said path is established, by transmitting said any received packets at said second port, in accordance with said forwarding information associated with said packet flow.

38. The method of claim 37, wherein:

said expected packet arrival time information further indicates a repeat time interval between packets that are associated with said packet flow and that are expected to be received by said switch; and said periodically re-establishing said path comprises periodically re-establishing said path according to said repeat time interval.

39. The method of claim 34, wherein:

said forwarding said packet comprises forwarding said packet without referencing destination information within said packet.

* * * * *